US010568140B2

(12) United States Patent
Islam et al.

(10) Patent No.: US 10,568,140 B2
(45) Date of Patent: Feb. 18, 2020

(54) BEAM AND SYMBOL SELECTION TO TRANSMIT RACH

(71) Applicant: QUALCOMM Incorporated, San Diego, CA (US)

(72) Inventors: Muhammad Nazmul Islam, Edison, NJ (US); Tao Luo, San Diego, CA (US); Bilal Sadiq, Basking Ridge, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/371,978

(22) Filed: Dec. 7, 2016

(65) Prior Publication Data

US 2017/0332406 A1 Nov. 16, 2017

Related U.S. Application Data

(60) Provisional application No. 62/337,168, filed on May 16, 2016, provisional application No. 62/343,116, filed on May 30, 2016.

(51) Int. Cl.
*H04W 74/08* (2009.01)
*H04W 16/28* (2009.01)
(Continued)

(52) U.S. Cl.
CPC ....... *H04W 74/0833* (2013.01); *H04W 16/28* (2013.01); *H04W 52/242* (2013.01); *H04W 52/34* (2013.01); *H04W 52/367* (2013.01)

(58) Field of Classification Search
CPC ............. H04W 74/0833; H04W 16/28; H04W 52/242; H04W 52/34; H04W 52/367
See application file for complete search history.

(56) References Cited

U.S. PATENT DOCUMENTS 9,184,511 B2 11/2015 Ma et al.
9,311,198 B2 4/2016 Rubin et al.
(Continued)

FOREIGN PATENT DOCUMENTS

CA 2943697 A1 10/2015
CN 101601317 A 12/2009
CN 104521312 A 4/2015

OTHER PUBLICATIONS

ISA/EP, International Search Report and Written Opinion of the International Searching Authority, Int'l Application No. PCT/US2017/030366, dated Sep. 14, 2017, European Patent Office, Rijswijk, NL, 14 pgs.

*Primary Examiner* — Duc C Ho
(74) *Attorney, Agent, or Firm* — Holland & Hart LLP

(57) ABSTRACT

Methods, systems, and devices for wireless communication are described. A user equipment (UE) may identify a number of beam directions that satisfy a transmission power condition. The UE may select a beam direction for a random access signal by choosing one of the beam directions that satisfies additional criteria, such as transmitting a random access message at the next opportunity. The transmission power may be selected based on a target receive power and a path loss for the selected beam. In some cases, if the sum of the path loss for a beam direction and the target receive power exceeds a maximum transmission power by more than a predetermined amount, the random access signal will not be transmitted using that beam. In some cases, if a response to the random access is not received, a different beam direction may be selected, the transmission power may be increased, or both.

30 Claims, 21 Drawing Sheets

(51) Int. Cl.
    *H04W 52/34*     (2009.01)
    *H04W 52/36*     (2009.01)
    *H04W 52/24*     (2009.01)

(56) References Cited

U.S. PATENT DOCUMENTS

| | | |
|---|---|---|
| 9,814,068 B2 | 11/2017 | Frenne et al. |
| 9,907,093 B2 | 2/2018 | Park et al. |
| 2008/0218413 A1 | 9/2008 | Li et al. |
| 2009/0170514 A1 | 7/2009 | Yokoyama |
| 2013/0102345 A1* | 4/2013 | Jung ............... H04B 7/0456 455/513 |
| 2013/0286960 A1* | 10/2013 | Li .................. H04W 72/042 370/329 |
| 2014/0010178 A1* | 1/2014 | Yu .................. H04W 74/0833 370/329 |
| 2014/0016573 A1 | 1/2014 | Nuggehalli et al. |
| 2014/0177607 A1 | 6/2014 | Li et al. |
| 2014/0376466 A1 | 12/2014 | Jeong et al. |
| 2015/0208443 A1 | 7/2015 | Jung et al. |
| 2016/0007377 A1* | 1/2016 | Frenne ............. H04W 56/001 370/329 |
| 2016/0043792 A1 | 2/2016 | Jeong et al. |
| 2016/0066197 A1* | 3/2016 | Park ................. H04W 16/28 370/329 |
| 2017/0006593 A1 | 1/2017 | Liu |
| 2017/0026962 A1* | 1/2017 | Liu ................. H04W 52/10 |
| 2017/0231011 A1* | 8/2017 | Park ................. H04W 16/14 |
| 2017/0332407 A1 | 11/2017 | Islam et al. |
| 2018/0041949 A1 | 2/2018 | Liu et al. |

\* cited by examiner

Beamforming for First Symbol

Beamforming for Second Symbol

BEAM AND SYMBOL SELECTION TO TRANSMIT RACH

CROSS REFERENCES

The present Application for Patent claims priority to U.S. Provisional Patent Application No. 62/337,168 by Islam, et al., entitled "Beam and Symbol Selection To Transmit RACH," filed May 16, 2016 and to U.S. Provisional Patent Application No. 62/343,116 by Islam, et al., entitled "Beam and Symbol Selection To Transmit RACH" filed May 30, 2016, assigned to the assignee hereof.

BACKGROUND

The following relates generally to wireless communication, and more specifically to beam and symbol selection to transmit a random access channel (RACH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communication systems may operate in millimeter wave (mmW) frequency ranges (e.g., 28 GHz, 40 GHz, 60 GHz, etc.). Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select a beam direction (e.g., beam identification (ID)) for communicating with a network by selecting the strongest beam from among a number of reference signals transmitted by a base station. However, the strongest beam may be associated with an access time period that results in a significant delay before an access message may be sent. This may result in a delay in accessing the network, or an increased interruption in reestablishing a connection.

SUMMARY

A user equipment (UE) may identify a number of beam directions that satisfy a path loss or transmission power condition. The UE may then select a beam direction for transmitting a random access signal by choosing one of the acceptable beam directions that satisfies additional criteria. For example, if each beam direction is associated with a random access time slot, a beam direction may be selected to reduce the time before the random access signal may be transmitted. The transmission power may be selected based on a target receive power and a path loss for the selected beam direction. In some cases, if the sum of the path loss for a beam direction and the target receive power exceeds a maximum transmission power by more than a predetermined amount, the random access signal will not be transmitted using that beam direction. In some cases, if a response to the random access is not received, a different beam direction may be selected, the transmission power may be increased, or both.

A method of wireless communication is described. The method may include identifying a plurality of beam directions that satisfy a transmit power condition, selecting a beam direction from the plurality of beam directions, and transmitting a random access signal using resources corresponding to the selected beam direction.

An apparatus for wireless communication is described. The apparatus may include means for identifying a plurality of beam directions that satisfy a transmit power condition, means for selecting a beam direction from the plurality of beam directions, and means for transmitting a random access signal using resources corresponding to the selected beam direction.

Another apparatus for wireless communication is described. The apparatus may include a processor, memory in electronic communication with the processor, and instructions stored in the memory. The instructions may be operable to cause the processor to identify a plurality of beam directions that satisfy a transmit power condition, select a beam direction from the plurality of beam directions, and transmit a random access signal using resources corresponding to the selected beam direction.

A non-transitory computer readable medium for wireless communication is described. The non-transitory computer-readable medium may include instructions operable to cause a processor to identify a plurality of beam directions that satisfy a transmit power condition, select a beam direction from the plurality of beam directions, and transmit a random access signal using resources corresponding to the selected beam direction.

Some examples of the method, apparatus, or non-transitory computer-readable medium described above may further include processes, features, means, or instructions for identifying a next random access time period, wherein the beam direction is selected based at least in part on the next random access period including a random access opportunity corresponding to the beam direction. Some examples of the method, apparatus, or non-transitory computer-readable medium described above may further include processes, features, means, or instructions for determining a channel metric for each of the plurality of beam directions, wherein the beam direction is selected based at least in part on the channel metric for each of the plurality of beam directions.

Some examples of the method, apparatus, or non-transitory computer-readable medium described above may further include processes, features, means, or instructions for determining a channel metric for each of the plurality of beam directions that has a corresponding random access opportunity in a next random access period, wherein the beam direction is selected based at least in part on a beam strength for each of the plurality of beam directions that has a corresponding random access opportunity in a next random access period. In some examples of the method, apparatus, or non-transitory computer-readable medium described above, the beam direction is selected randomly from among the plurality of beam directions.

Some examples of the method, apparatus, or non-transitory computer-readable medium described above may further include processes, features, means, or instructions for identifying a target receive power and a maximum transmit power. Some examples of the method, apparatus, or non-transitory computer-readable medium described above may further include processes, features, means, or instructions for identifying a path loss for each of the plurality of beam directions, wherein the transmit power condition is based at least in part on the target receive power, the maximum transmit power, and the path loss for each of the plurality of beam directions.

Some examples of the method, apparatus, or non-transitory computer-readable medium described above may further include processes, features, means, or instructions for determining a transmit power based at least in part on the target receive power, the maximum transmit power, and a path loss for the beam direction, wherein the random access signal is transmitted using the identified transmit power.

In some examples of the method, apparatus, or non-transitory computer-readable medium described above, determining that a sum of the target receive power and the path loss for the beam direction is greater than the maximum transmit power, wherein determining the transmit power comprises: setting the transmit power to the maximum transmit power. In some examples of the method, apparatus, or non-transitory computer-readable medium described above, determining that a sum of the target receive power and the path loss for the beam direction is less than the maximum transmit power, wherein determining the transmit power comprises: setting the transmit power to the sum of the target receive power and the path loss for the beam direction.

Some examples of the method, apparatus, or non-transitory computer-readable medium described above may further include processes, features, means, or instructions for identifying a power gap parameter. Some examples of the method, apparatus, or non-transitory computer-readable medium described above may further include processes, features, means, or instructions for determining that a sum of the target receive power and a path loss for the beam direction is less than a sum of the maximum transmit power and the power gap parameter, wherein transmitting the random access signal is based at least in part on the determination.

Some examples of the method, apparatus, or non-transitory computer-readable medium described above may further include processes, features, means, or instructions for receiving a system information message, wherein the power gap parameter is identified based at least in part on the system information message. In some examples of the method, apparatus, or non-transitory computer-readable medium described above, the system information message is transmitted using a Long Term Evolution (LTE) band, a millimeter wave (mmW) band, a sub 5 GHz band, or any combination thereof.

In some examples of the method, apparatus, or non-transitory computer-readable medium described above, the system information message comprises a system information block (SIB) message, a user equipment (UE) specific physical downlink shared channel (PDSCH) message, a dedicated subframe broadcast, or any combination thereof. In some examples of the method, apparatus, or non-transitory computer-readable medium described above, the dedicated subframe broadcast comprises an extended physical broadcast channel.

Some examples of the method, apparatus, or non-transitory computer-readable medium described above may further include processes, features, means, or instructions for identifying a power gap parameter. Some examples of the method, apparatus, or non-transitory computer-readable medium described above may further include processes, features, means, or instructions for determining that a sum of the target receive power and a path loss for a previously identified beam direction is greater than a sum of the maximum transmit power and the power gap parameter. Some examples of the method, apparatus, or non-transitory computer-readable medium described above may further include processes, features, means, or instructions for refraining from transmitting the random access signal at a time associated with the previously identified beam direction based at least in part on the determination.

Some examples of the method, apparatus, or non-transitory computer-readable medium described above may further include processes, features, means, or instructions for receiving a random access configuration from a base station, wherein the transmit power condition is based at least in part on the configuration message. Some examples of the method, apparatus, or non-transitory computer-readable medium described above may further include processes, features, means, or instructions for receiving a plurality of directional synchronization signals, wherein each of the plurality of beam directions corresponds to one of the plurality of directional synchronization signals.

In some examples of the method, apparatus, or non-transitory computer-readable medium described above, the plurality of directional synchronization signals comprises a first set of directional synchronization signals transmitted during a first time period and interleaved with a second set of directional synchronization signals transmitted during a second time period. In some examples of the method, apparatus, or non-transitory computer-readable medium described above, the plurality of directional synchronization signals comprises a first set of directional synchronization signals transmitted using a first set of antenna ports and interleaved with a second set of directional synchronization signals transmitted using a second set of antenna ports simultaneously with the first set of directional synchronization signals.

A method of wireless communication is described. The method may include transmitting a first random access signal at a first transmit power during a first time period associated with a first beam direction, determining that a random access response to the first random access signal has not been received, selecting a second transmit power and a second beam direction based at least in part on the determination, and transmitting a second random access signal using the second transmit power during a second time period associated with the second beam direction.

An apparatus for wireless communication is described. The apparatus may include means for transmitting a first random access signal at a first transmit power during a first time period associated with a first beam direction, means for determining that a random access response to the first random access signal has not been received, means for selecting a second transmit power and a second beam direction based at least in part on the determination, and means for transmitting a second random access signal using the second transmit power during a second time period associated with the second beam direction.

Another apparatus for wireless communication is described. The apparatus may include a processor, memory in electronic communication with the processor, and instructions stored in the memory. The instructions may be operable to cause the processor to transmit a first random access signal at a first transmit power during a first time period associated with a first beam direction, determine that a random access response to the first random access signal has not been received, select a second transmit power and a second beam direction based at least in part on the determination, and transmit a second random access signal using the second transmit power during a second time period associated with the second beam direction.

A non-transitory computer readable medium for wireless communication is described. The non-transitory computer-readable medium may include instructions operable to cause a processor to transmit a first random access signal at a first transmit power during a first time period associated with a first beam direction, determine that a random access response to the first random access signal has not been received, select a second transmit power and a second beam direction based at least in part on the determination, and transmit a second random access signal using the second transmit power during a second time period associated with the second beam direction.

Some examples of the method, apparatus, or non-transitory computer-readable medium described above may further include processes, features, means, or instructions for determining that a second random access response to the second random access signal has not been received; and continuing to transmit additional random access signals until a corresponding additional random access response is received, wherein successive additional random access signals are alternately transmitted based on either an updated preferred beam direction or an increased transmit power.

Some examples of the method, apparatus, or non-transitory computer-readable medium described above may further include processes, features, means, or instructions for identifying a preferred beam direction based at least in part on the determination that the random access response to the first random access signal has not been received, wherein the preferred beam direction is not equal to the first beam direction. Some examples of the method, apparatus, or non-transitory computer-readable medium described above may further include processes, features, means, or instructions for identifying a next random access time period, wherein the preferred beam direction is selected based at least in part on the next random access period including a random access opportunity corresponding to the preferred beam direction.

Some examples of the method, apparatus, or non-transitory computer-readable medium described above may further include processes, features, means, or instructions for determining a channel metric for each of a plurality of beam directions, wherein the preferred beam direction is selected based at least in part on the channel metric for each of the plurality of beam directions. Some examples of the method, apparatus, or non-transitory computer-readable medium described above may further include processes, features, means, or instructions for determining a beam strength for each of a plurality of beam directions, wherein the beam direction is selected based at least in part on the beam strength for each of the plurality of beam directions.

In some examples of the method, apparatus, or non-transitory computer-readable medium described above, the second transmit power is greater than the first transmit power and the second beam direction is equal to the first beam direction. In some examples of the method, apparatus, or non-transitory computer-readable medium described above, the second transmit power is equal to the first transmit power and the second beam direction is equal to the preferred beam direction.

Some examples of the method, apparatus, or non-transitory computer-readable medium described above may further include processes, features, means, or instructions for determining that a second random access response to the second random access signal has not been received; identifying an updated preferred beam direction that is not equal to the first beam direction; and transmitting a third random access signal using the updated preferred beam direction and the second transmit power.

Some examples of the method, apparatus, or non-transitory computer-readable medium described above may further include processes, features, means, or instructions for determining that a third random access response to the third random access signal has not been received; selecting a third transmit power that is greater than the second transmit power; and transmitting a fourth random access signal using the updated preferred beam direction and the third transmit power.

In some examples of the method, apparatus, or non-transitory computer-readable medium described above, the second transmit power is greater than the first transmit power and the second beam direction is equal to the preferred beam direction. Some examples of the method, apparatus, or non-transitory computer-readable medium described above may further include processes, features, means, or instructions for receiving a power ramp up configuration from a base station, wherein the second transmit power and the second beam direction are based at least in part on the power ramp up indication. In some examples of the method, apparatus, or non-transitory computer-readable medium described above, the power ramp up configuration is transmitted in a system information block (SIB) message.

A method of wireless communication is described. The method may include transmitting a random access configuration to a user equipment (UE), wherein the random access configuration indicates a procedure for selecting a beam direction based at least in part on a transmit power condition and receiving a random access signal from the UE based at least in part on the procedure.

An apparatus for wireless communication is described. The apparatus may include means for transmitting a random access configuration to a user equipment (UE), wherein the random access configuration indicates a procedure for selecting a beam direction based at least in part on a transmit power condition and means for receiving a random access signal from the UE based at least in part on the procedure.

Another apparatus for wireless communication is described. The apparatus may include a processor, memory in electronic communication with the processor, and instructions stored in the memory. The instructions may be operable to cause the processor to transmit a random access configuration to a user equipment (UE), wherein the random access configuration indicates a procedure for selecting a beam direction based at least in part on a transmit power condition and receive a random access signal from the UE based at least in part on the procedure.

A non-transitory computer readable medium for wireless communication is described. The non-transitory computer-readable medium may include instructions operable to cause a processor to transmit a random access configuration to a user equipment (UE), wherein the random access configuration indicates a procedure for selecting a beam direction based at least in part on a transmit power condition and receive a random access signal from the UE based at least in part on the procedure.

In some examples of the method, apparatus, or non-transitory computer-readable medium described above, the procedure for selecting the beam direction is based at least in part on a next random access time period comprising a random access opportunity for the beam direction, a channel metric, a beam strength, a random selection procedure, or any combination thereof. Some examples of the method, apparatus, or non-transitory computer-readable medium described above may further include processes, features, means, or instructions for transmitting a plurality of directional synchronization signals, wherein the random access signal is received during a time period associated with a beam direction of one of the plurality of directional synchronization signals. In some examples of the method, apparatus, or non-transitory computer-readable medium described above, the random access configuration comprises a power gap parameter that indicates a threshold for transmitting a random access message when a sum of a target receive power and a path loss is greater a maximum transmit power.

A method of wireless communication is described. The method may include transmitting a power ramp up configuration to a user equipment (UE), wherein the power ramp up configuration indicates a procedure for selecting a transmit power and a beam direction following a failure of a random access signal and receiving a random access signal from the UE based at least in part on the procedure.

An apparatus for wireless communication is described. The apparatus may include means for transmitting a power ramp up configuration to a user equipment (UE), wherein the power ramp up configuration indicates a procedure for selecting a transmit power and a beam direction following a failure of a random access signal and means for receiving a random access signal from the UE based at least in part on the procedure.

Another apparatus for wireless communication is described. The apparatus may include a processor, memory in electronic communication with the processor, and instructions stored in the memory. The instructions may be operable to cause the processor to transmit a power ramp up configuration to a user equipment (UE), wherein the power ramp up configuration indicates a procedure for selecting a transmit power and a beam direction following a failure of a random access signal and receive a random access signal from the UE based at least in part on the procedure.

A non-transitory computer readable medium for wireless communication is described. The non-transitory computer-readable medium may include instructions operable to cause a processor to transmit a power ramp up configuration to a user equipment (UE), wherein the power ramp up configuration indicates a procedure for selecting a transmit power and a beam direction following a failure of a random access signal and receive a random access signal from the UE based at least in part on the procedure.

DETAILED DESCRIPTION

Figure 1:
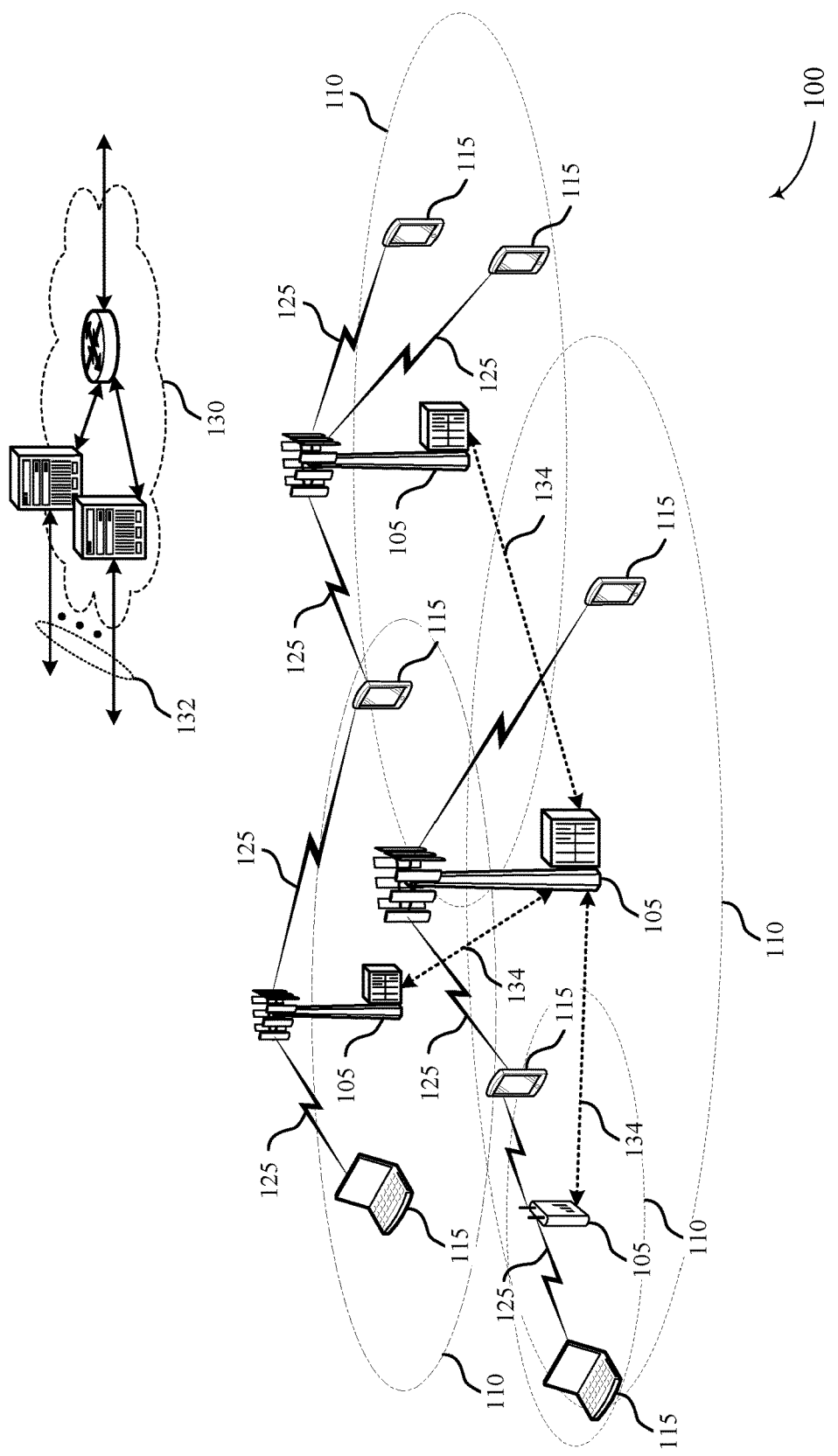
FIGS. 1 and 2 illustrate examples of systems for wireless communication that support beam and symbol selection to transmit random access channel (RACH) in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select a beam direction (e.g., a beam identification (ID)) for communicating with a network by selecting the strongest beam from among a number of reference signals transmitted by a base station. However, the strongest beam may be associated with an access time period that results in a significant delay before an access message may be sent. This may result in a delay in accessing the network, or an increased interruption in reestablishing a connection.

In mmW systems, synchronization signals may be beamformed to meet a certain link budget (e.g., an accounting of gains and losses associated with a transmitter and/or a receiver when communicating over a medium). In particular, beamforming may be used to increase the strength or power of wireless signals in a certain direction. Base stations may use several antenna ports connected to subarrays of antennas to form the beams in various directions by appropriately weighting the magnitude and phase of individual antenna ports and signals. A base station may thus use beamforming to transmit the synchronization signals in multiple directions, for example, using different beam IDs.

Beamforming techniques may create unnecessary latency, as base stations may be limited in the number of directions that the base station may transmit (e.g., by the number of ports the base station has). For example, with beam sweeping, base stations may transmit a synchronization signal in specified directions within a given timeframe. If a user equipment (UE) is not within the specified direction, the UE will not receive the synchronization signal, and the UE may not communicate with the base station. This may cause latency, as the UE may have to wait for the base station's sweeping process to transmit the synchronization signal in the direction of the UE. Further delays may result if the strongest beam detected by the UE is not associated with the next random access opportunity.

One technique for reducing latency may be to alternate or interleave beamforming direction patterns to expand the number of directions a base station transmits beams at (e.g., to cover a larger area) during a given time. For example, a base station may interleave beamforming patterns, where a beam in a first pattern may radially alternate with beams of a second pattern. The first pattern may transmit a synchronization signal. However, there may not be a high received power at a UE because of low gain of a beam. A UE may still decode the received synchronization signal for random access message purposes even though the UE may have to wait to receive a second synchronization signal in order to determine beamforming parameters to use in communication with the base station. This early synchronization signal decoding may reduce latency by reducing the time a UE may wait to receive the synchronization signal.

Subsequently, a UE may identify a number of beam directions that satisfy a path loss or transmission power condition. The UE may then select a beam direction for transmitting a random access signal by choosing one of the acceptable beam directions that satisfies additional criteria. For example, if each beam direction is associated with a random access time slot, a beam direction may be selected to reduce the time before the random access signal may be transmitted. The transmission power may be selected based on a target receive power and a path loss for the selected beam direction. In some cases, if the sum of the path loss for a beam direction and the target receive power exceeds a maximum transmission power by more than a predetermined amount, the random access signal will not be transmitted using that beam direction. In some cases, if a response to the random access is not received, a different beam direction may be selected, the transmission power may be increased, or both.

Aspects of the disclosure are initially described in the context of a wireless communication system. Examples are then described of timing configurations and process flows that support selection of a beam direction and transmit power. Aspects of the disclosure are further illustrated by and described with reference to apparatus diagrams, system diagrams, and flowcharts that relate to title of the application.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) or LTE-Advanced network. Wireless communications system 100 may support UEs 115 that may select a beam direction from among a number of suitable beam directions (e.g., to minimize delay in establishing a connection to the network).

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130 ). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may operate in an ultra-high frequency (UHF) frequency or mmW region using frequency bands from 700 MHz to 2600 MHz (2.6 GHz) or higher, although in some cases wireless local area network (WLAN) networks may also use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

A frame structure may be used to organize physical resources in wireless communications system 100. A frame may be a 10 ms interval that may be further divided into 10 equally sized sub-frames. Each sub-frame may include two consecutive time slots. Each slot may include 6 or 7 orthogonal frequency division multiple access (OFDMA) symbol periods. A resource element consists of one symbol period and one subcarrier (a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific RS (CRS) and a UE-specific RS (UE-RS). A UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

Time intervals in wireless communications system 100 may be expressed in multiples of a basic time unit (e.g., the sampling period, $T_s=1/30,720,000$ seconds). Time resources may be organized according to radio frames of length of 10 ms ($T_f=307200$ Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

After the UE 115 receives a number of synchronization signals, reference signals, and system information messages, the UE 115 may transmit a random access channel (RACH) preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit a radio resource control (RRC) connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message(e.g., if there is a conflict with another UE 115 ) it may repeat the RACH process by transmitting a new RACH preamble.

In some cases, base station or UE antennas may be located within one or more antenna arrays. One or more antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Figure 2:
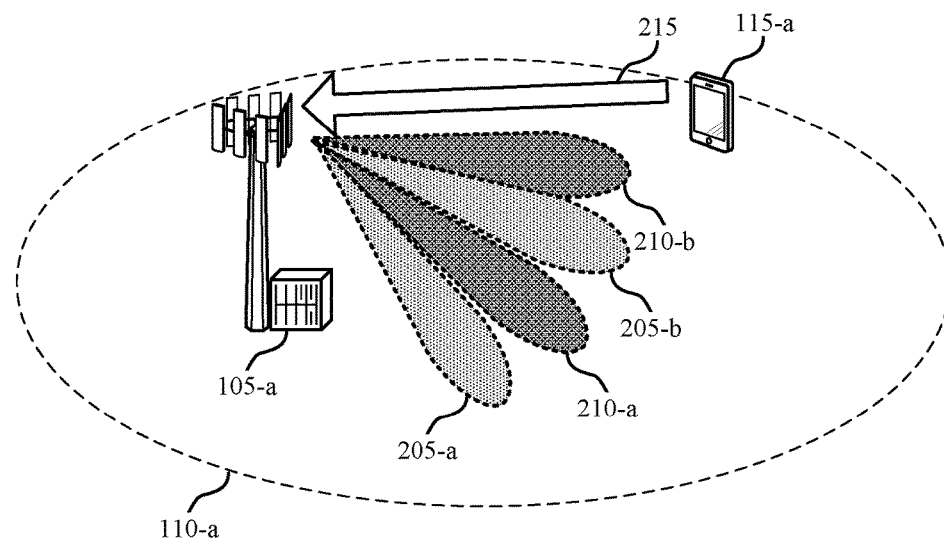
Figure 2:
Figure 2:

FIG. 2 illustrates an example of a wireless communications system 200 for interleaved beam sweeping for synchronization and random access. Wireless communications system 200 may include base station 105-*a* and UEs 115-*a* and 115-*b*, which may be examples of the corresponding devices described with reference to FIG. 1. Wireless communications system 100 may support UEs 115 that may select a beam direction (e.g., a beam ID) from among a number of suitable beam directions (e.g., to minimize delay in establishing a connection to the network).

Base station 105-*a* may communicate with UE 115-*a* using directional transmissions (e.g., to account for path loss associated with operating in a mmW environment). In some cases (as illustrated), base station 105-*a* may use interleaved directional synchronization signals to reduce the time before UE 115-*a* receives an acceptable beam. In some cases, groups of interleaved beams 205 and 210 are transmitted at different time periods. In some cases, the interleaved directional synchronization signals may be transmitted using different antenna ports. In some cases, a sweeping pattern may be used that does not use interleaved beams.

UE 115-*a* may receive the directional synchronization signals and identify a number of candidate beam directions for transmitting a random access signal 215 based on a transmission power condition. In general, a random access preamble transmission power, $P_{RACH}$, may be determined according to the equation:

$$P_{RACH} = \min\{P_{CMAX(i)}, \text{Preamble\_Received\_Target\_Power} + PL\} \text{ [dBm]},$$

where $P_{CMAX(i)}$ is the configured UE transmit power defined for a given subframe with index i, PL is the downlink path loss estimate (e.g., calculated by UE 115-*a* based on the received power of a beamforming reference signal (BRS) associated with a given beam), and, Preamble_Received_Target_Power is a parameter that base station 105-*a* may set to indicate the power at which it would like to receive the random access signal 215. Power transmission parameters may be set by base station 105-*a* using a system information message, i.e., in a system information block (SIB) transmission.

In some cases, a beam may be identified as a suitable candidate if the desired transmit power is less than a maximum transmit power:

$$\text{Preamble\_Receive\_Target\_Power} + PL \geq P_{CMAX(i)}$$

Accordingly, a beam direction may be considered inadequate or restricted if the path loss corresponding to that direction satisfies:

$$\text{Preamble\_Receive\_Target\_Power} + PL \geq P_{CMAX(i)}$$

In other cases, different parameters may be used to select the candidate beam directions. However, the transmission power may still be limited by the maximum transmission power $P_{CMAX(i)}$. In some cases, a UE may identify suitable beam directions based on a power gap parameter, a, according to the equation:

$$\text{Preamble\_Receive\_Target\_Power} + PL \geq P_{CMAX(i)} + \alpha$$

Accordingly, a beam direction may be considered inadequate or restricted if the path loss corresponding to that direction satisfies:

$$Preamble_{Receive_{Target_{Power}}} + PL > P_{CMAX(i)} + \alpha$$

That is, UE 115-*a* may identify a beam direction as a candidate if the sum of the target receive power and the path loss for a beam direction exceed the maximum transmit power by less than the power gap parameter. Thus, UE 115-*a* may identify a number of candidate beam directions. UE 115-*a* may then select a beam direction, and transmit a random access message using resources associated with the selected beam direction. In some cases, the beam direction may be selected such that UE 115-*a* may transmit the random access message during a next available random access opportunity as further described below with reference to FIG. 3. In some cases, UE 115-*a* may select a beam based on a channel metric for the candidate beam directions (i.e., the direction with the lowest path loss or high signal-to-noise ratio). In some cases, the beam direction with the highest received beam strength may be selected. In other cases, the beam direction may be selected randomly from among the candidate beams.

In some cases, P RACH may indicate an initial transmit power for a random access message. That is, UE 115-*a* may initially transmit a random access message using $P_{RACH}$, but, if it does not get a RACH response message, it may ramp up the transmit power in the subsequent RACH transmissions. That is, in some cases, $P_{RACH}$ may be less than the maximum transmit power $P_{CMAX(i)}$.

Thus, for example, UE 115-*a* may initially transmit at $P_{RACH}$ using a given beam direction, I. In the next subframe, UE 115-*a* transmits at $P_{RACH}+\beta$, where the parameter $\beta$ represents the amount of the power increase. In some cases, UE 115-*a* may continue to use beam I even if the current preferred beam is different (i.e., beam J). In another example, UE 115-*a* initially transmits at $P_{RACH}$ using beam I. Then, in the next subframe, UE 115-*a* may transmit at the same power level using the current preferred beam, beam J. In yet another example, UE 115-*a* initially transmits at $P_{RACH}$ using beam I, then in the next subframe, transmits at $P_{RACH}+\beta$ using the new preferred beam J. In some cases, base station 105-a may indicate the procedures for selecting candidate beams, transmit power, and power ramp up in a RACH configuration message.

In some examples, UE 115-a may ramp up transmit power in some RACH retransmissions and select a preferred beam in other RACH retransmissions. For example, if UE 115-a initially transmits RACH message at $P_{RACH}$ power while selecting beam I for its transmission time and this transmission fails, then in the next RACH opportunity, UE 115-a may transmit using power level $P_{RACH}+\beta$ and using the transmission time corresponding to the same beam, i.e., beam I. If this RACH transmission fails, then in the next RACH opportunity, UE 115-a may transmit using power $P_{RACH}+\beta$ while selecting the transmission time corresponding to the new preferred beam, i.e., beam J. If the second RACH transmission fails, then in the next RACH opportunity, UE 115-a may transmit using power level $P_{RACH}+2\beta$ while selecting the transmission time corresponding to the previously preferred beam J. If the third RACH transmission fails, then in the next RACH opportunity, UE 115-a may transmit at $P_{RACH}+2\beta$ with yet another preferred beam, i.e., beam K.

In cases when interleaved sweeping is used, base station 105-a may configure a first set of beam directions for a synchronization signal to be broadcasted to UE 115-a. Base station 105-a may perform this transmission by beamforming using interleaved sweeping. The base station may transmit a first plurality of synchronization signals over a first symbol period of a synchronization subframe and a second plurality of synchronization signals over a second symbol period of a synchronization subframe. For the first plurality of synchronization signals, base station 105-a may transmit the synchronization signals in a first set of beams (e.g., beams 205-a and 205-b), where the first set of beams correspond to a part of a first set of directions. For the second symbol period, base station 105-a may transmit the second plurality of synchronization signals in a second set of beams (e.g., beams 210-a and 210-b), where the second set of beams may correspond to a part of a second set of beam directions. The second set of beam directions may interleave with the first set of directions. For example, beam 210-a may be spatially in between beam 205-a and beam 205-b, and beam 205-b may spatially be between beam 210-a and beam 210-b.

Thus, in some cases, the first set of beams may include two sets of interleaved beams. In this way, the first and second sets of beams may be spread further apart to cover a larger area. In FIG. 2, the first set of beams may include two beams, beams 205-a and 205-b, and the second set of beams may include two beams, beams 210-a and 210-b. In other examples, more beams may be included in the first and second set of beams. In some examples, three or more sets of beams may be used. For example, base station 105-a may support eight antenna ports for beamforming, and the first set of beams may include eight beams 205 that are spatially interleaved with a second set of beams that may also include eight beams 210. In some examples, each of beams 205 may alternate with each of beams 210, such that a first beam of the first set of beams 205 may be oriented at a first angle, a first beam of the second set of beams 210 may be oriented at a second angle adjacent to the first beam of the first set of beams 205, followed at a next radial angle by a second beam of the first set of beams 205 that is oriented at a third angle adjacent to the first beam of the second set of beams 210, followed at a next radial angle by a second beam of the second set of beams 210 that is oriented at a fourth angle adjacent to the second beam of the first set of beams 205, and so on. As such, the first set of beams may have an angular spread about a vertical axis of the base station that is approximately the same as the angular spread of the second set of beams about the vertical axis of the base station. For example each of the first set of beams and the second set of beams may have an angular spread of about 60° to 90°.

In other examples, the first set of beams and the second set of beams may be interleaved according to other arrangements or patterns, e.g. that do not strictly alternate. For example, two of beams 205 may be followed by two of beams 210, followed by two of beams 205, followed by two of beams 210, and so on.

Other examples may include interleaving beams of the first set of beams with beams of the second set of beams in both an angular direction about the vertical axis of the base station as well as in the vertical direction where vertical beamforming may be used. For example, a first beam 205 may by oriented above (e.g., to be directed vertically higher than) first beam 210 at a first angular direction about the vertical base station axis, while a second beam 210 may by oriented above second beam 205 in a second angular direction about the vertical base station axis that is adjacent to the first angular direction. A third beam 205 may by oriented above third beam 210 in a third angular direction about the vertical base station axis that is adjacent to the second angular direction, and so on. As further described below, more than two sets of beams (e.g., three or more sets of beams) may be spatial interleaved according to other patterns, and thereby decrease latency during synchronization.

UE 115-a may decode synchronization signals received from the base station. UE 115-a may receive the first plurality of synchronization signals in the first set of directions (e.g., beams 205-a and 205-b). However, the receiving power of the first plurality of synchronization signals may be weak due to a low gain corresponding to the first set of directions. UE 115-a may still be able to decode the synchronization signals and subsequently determine a set of frequencies to transmit to base station 105-b (e.g., for a random access message). UE 115-a may additionally receive a second plurality of synchronization signals in the second set of directions (e.g., beams 210-a and 210-b). The synchronization signal received in the second set of directions may have a stronger receiving power in relation to the synchronization signals received in the first set of directions. This may be due to a higher gain corresponding to the second set of directions. UE 115-a may then determine to allocate resources for the second symbol for the random access message transmission. Subsequently, UE 115-a may transmit the random access message. The random access message may be transmitted in the direction of the received synchronization signals for the second symbol period.

In other examples, base station 105-a may monitor for beams 205 in a first set of directions, and may monitor for beams 210 in a second set of direction (e.g., during a random access subframe), where the second set of beam directions may be spatially interleaved with the first set of beam directions. For example, the monitoring may include the base station altering antenna parameters (e.g., phase and amplitude) for a number of antenna elements in an antenna array to listen for signals at a particular time and frequency from UEs that may also have implemented beamforming to transmit to the base station 105-a. In some examples, UE 115-a may transmit a random access signal 215 (e.g., an access request) that may be part of a random access subframe. Similar to the transmission of beams 205 in a first set of directions and beams 210 in a second set of directions, UE 115-*a* may monitor in such directions where the beams are spatially interleaved in an angular direction about the vertical axis of the base station 105-*a* (e.g., by alternating or according to another pattern). In other examples, the first and second set of beams may also be vertically interleaved (e.g., alternating, or according to another pattern).

Thus, in some examples UE 115-*a* may have received one or more synchronization signals from base station 105-*a* as further described above, and transmit an access request or other signaling to base station 105-*a* during the random access subframe. As described above, base station 105-*a* may transmit or monitor using a first set of beams in a first symbol period and transmit or monitor using a second set of beams in a second symbol period. In some cases, the symbol periods may be adjacent symbol periods in a subframe (e.g., a synchronization subframe for transmission, or a random access subframe for monitoring). For example, a first symbol of a subframe to transmit on a first set of beams may be immediately adjacent to a second symbol of the subframe to transmit using a second set of beams, as described above. In other examples, the first set of beams may be used to transmit synchronization signals in both the first and second symbols of the subframe, while the second set of beams may be used to transmit synchronization signals in both a third and a fourth symbol of the subframe, for example to increase the likelihood of successful decoding by a UE 115 if conditions are poor.

Figure 3:
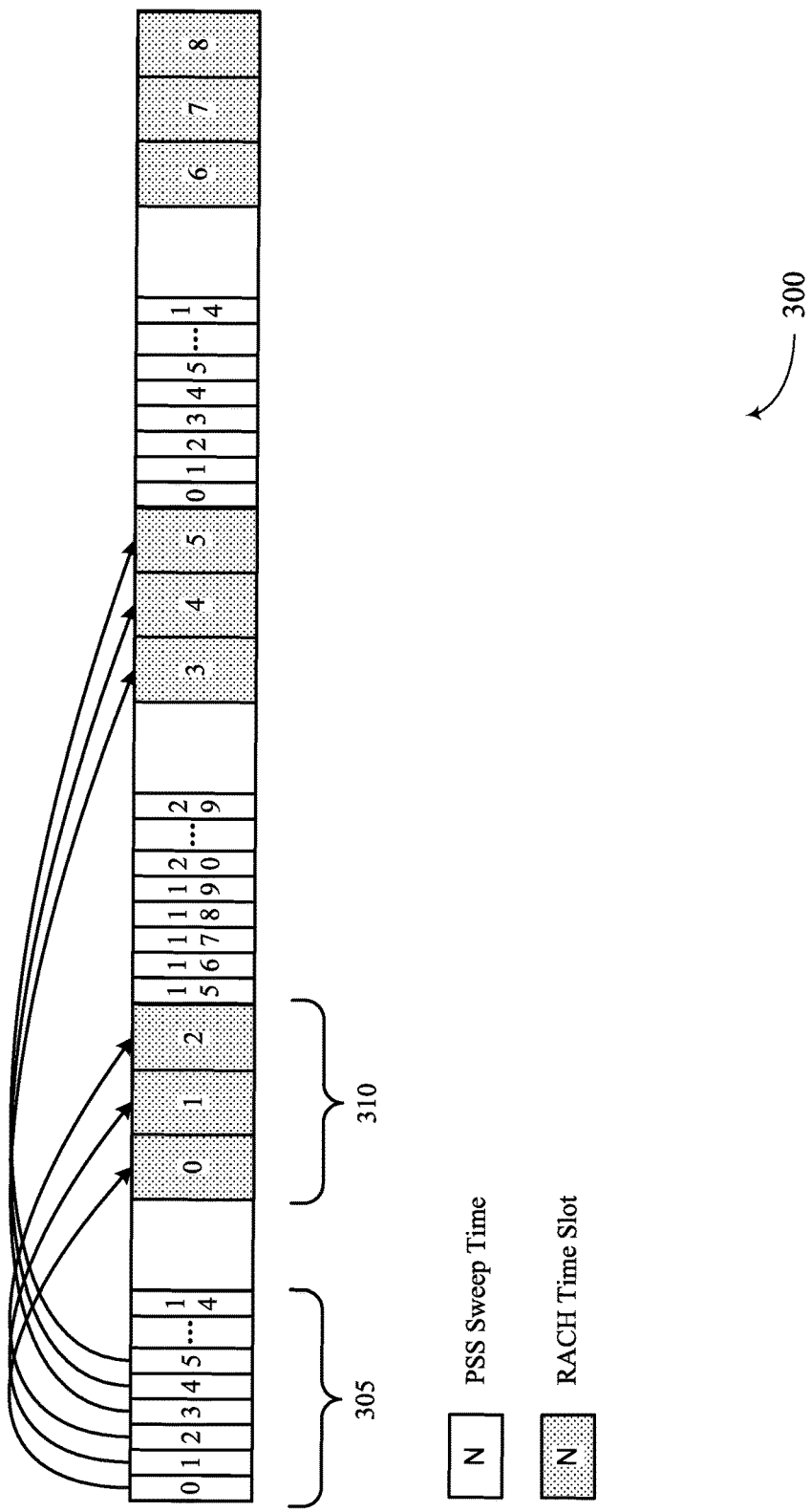
FIG. 3 illustrates an example of a timing configuration that supports beam and symbol selection to transmit RACH in accordance with aspects of the present disclosure.

FIG. 3 illustrates an example of a timing configuration 300 for beam and symbol selection to transmit RACH. In some cases, timing configuration 300 may represent aspects of techniques performed by a UE 115 or base station 105 as described with reference to FIG. 1. Timing configuration 300 may illustrate the timing for when UE 115 may receive a number of directional primary synchronization signals (PSS) during directional beam sweep time periods 305, and then transmit a random access message using a corresponding directional random access channel (RACH) opportunity 310. Timing configuration 300 illustrates that directional beam sweep time periods 305 may include up to fifteen PSSs, and that the corresponding directional RACH opportunity 310 may be used to transmit up to three RACH transmissions.

As described above, a UE 115 may receive a number of directional synchronization signals form a base station 105. The UE 115 may then select the best (or, at least a suitable) beam direction from among the received beams (i.e., based on the directional synchronization signal or an associated beam reference signal). In some cases, each PSS subframe may be used to transmit a different set of directional synchronization signal, and in other cases, a set of directional synchronization symbols may be retransmitted in a subsequent subframe.

The time during which the UE 115 may transmit a random access message may depend on the beam on the selected beam as illustrated in timing configuration 300. In some cases, the duration of a RACH transmission may be greater than that of a synchronization signal due to the difference in transmit power between the base station 105 and the UE 115. That is, an adequate signal may be achieved using either increased transmission power (i.e., the synchronization signal from the base station 105) or increase signal length (i.e., the RACH transmission from the UE 115). Hence, a synchronization subframe may include more synchronization signals and may cover more beam directions than a random access subframe. This may increase the UE latency to access the system. For example, if a UE 115 selects a beam with index 0, 1, or 2, it may transmit during the next subframe.

However, if UE 115 selects a beam with index 3, 4, or 5, it may wait until a subsequent subframe for the corresponding RACH opportunity 310. If the UE 115 selects a beam with a higher index than 5, it may wait even longer.

Thus, in some cases, as described above, a UE 115 may select a number of candidate beam directions based on a transmission power parameter, and then select the beam that will allow it to transmit a random access message during the soonest available subframe (or the UE 115 may use some combination of timing parameters, channel metrics, and signal strength to select a beam direction). For example, if a beam with index 2 and a beam with index 5 are both suitable, the UE 115 may choose the beam with index 2 so that it may transmit the random access signal sooner, even if the beam with index 5 has the highest beam received beam strength or the best channel conditions (e.g., a lower path loss).

Figure 4:
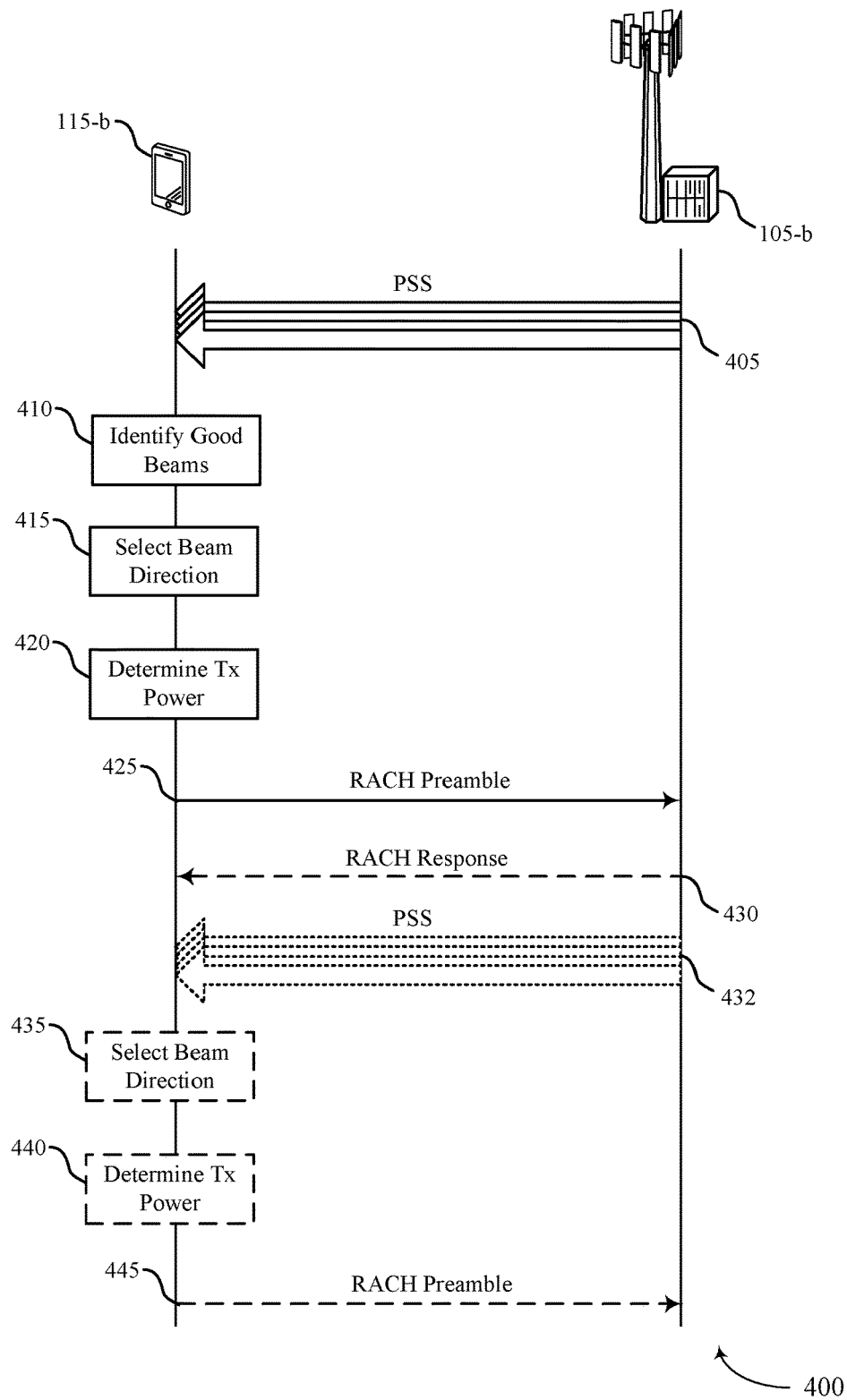
FIG. 4 illustrates an example of a process flow that supports beam and symbol selection to transmit RACH in accordance with aspects of the present disclosure.

FIG. 4 illustrates an example of a process flow 400 for beam and symbol selection to transmit RACH. In some cases, process flow 400 may represent aspects of techniques performed by a UE 115 or base station 105 as described with reference to FIG. 1. Process flow 400 may represent an example of a process by which a UE 115 may select a beam and a corresponding transmission power as described above.

At step 405, base station 105-*b* may transmit a number of directional synchronization signals to UE 115-*b*. In some cases, the directional synchronization signals are grouped into different interleaved sets and either transmitted using different time periods or using different antenna ports, or both. Base station 105-*b* may transmit one or more beam reference signals in addition to the directional primary synchronization signals (PSS).

At step 410, UE 115-*b* may identify a number of candidate beams based on a transmission power condition as described above. In some cases, the transmission power condition is based on a combination of a target receive power for a random access message, a path loss for a given beam direction, a maximum transmit power, and, in some cases, a power gap parameter.

At step 415, UE 115-*b* may select a preferred beam from among the candidate beams. The preferred beam may be selected based on a timing considerations (i.e., to provide the earliest available random access opportunity), a channel metric, a beam strength, or a random selection process.

At step 420, UE 115-*b* may determine the transmit power for the selected beam. In some cases, the transmit power is identified before the beam is selected (i.e., in order to determine if the beam is a suitable candidate beam).

At step 425, UE 115-*b* may transmit the random access signal (i.e., the RACH preamble) to base station 105-*b* using the chose transmit power and a time period corresponding to the selected beam direction as described above.

At step 430, if base station 105-*b* receives the random access signal from UE 115-*b*, it may respond with a random access response. In this case, UE 115-*b* and base station 105-*b* may continue with a random access procedure for establishing (or re-establishing) a network connection. However, in some cases the random access signal may not be received and UE 115-*b* may repeat the process. At step 423, in some cases, base station 105-*b* may transmit (and UE 115-*c* may receive) another set of directional synchronization signals and UE 115-*c* may select a new set of candidate beams (also not shown).

At step 435, UE 115-*b* may select a beam direction for retransmitting a random access signal after determining that the first random access signal failed. In some cases, UE 115-*b* may select a new preferred beam based on the plurality of beams that it received during the most recent directional synchronization signal subframe. However, in some cases UE 115-*b* may use the same beam direction even if a new beam direction would be selected based on the updated process (e.g., if UE 115-*b* increases the transmit power of the random access signal).

At step 440, UE 115-*b* may determine a transmit power for a retransmitted random access signal. In some cases, the transmit power may be increased from the previous transmit power used at step 420. The new transmit power may be selected according to a power ramp up procedure. For example, the transmit power may be increased from a previous transmit power by a predetermined amount (up to the maximum transmit power). In some cases, a transmit power increase may be applied (or not applied) to a newly determined transmit power associated with a new beam direction. In some cases, the same transmit power may be used that was used at step 420. In some cases, the amount of increase of transmit power might be conveyed via a secondary information block.

At step 445, UE 115-*b* may transmit another random access signal to base station 105-*b*. Once again, in some cases, this may initiate a random access response and a network connection. In some cases, the random access message may fail again and an updated beam direction and transmit power may be determined as described above.

Figure 5:
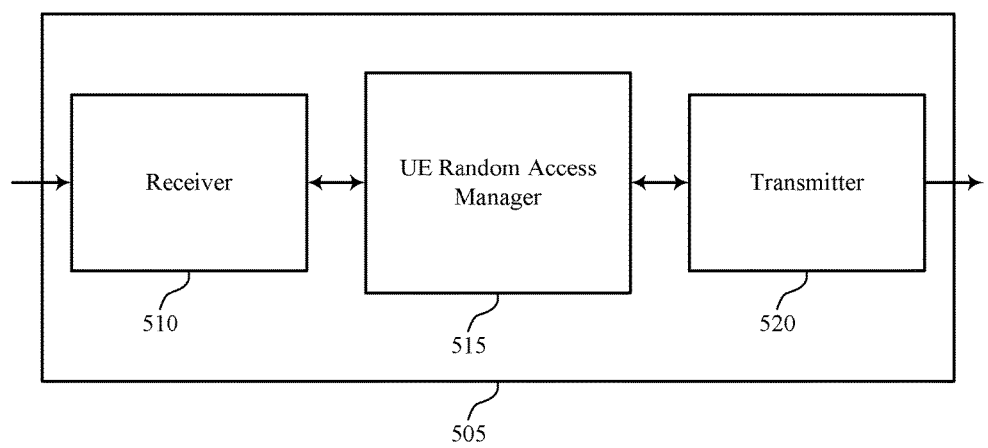
FIGS. 5 through 7 show block diagrams of a device that supports beam and symbol selection to transmit RACH in accordance with aspects of the present disclosure.

FIG. 5 shows a block diagram 500 of a device 505 that supports beam and symbol selection to transmit RACH in accordance with various aspects of the present disclosure. Device 505 may be an example of aspects of a UE 115 as described with reference to FIGS. 1 and 2. Device 505 may include receiver 510, UE random access manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to beam and symbol selection to transmit RACH, etc.). Information may be passed on to other components of the device. The receiver 510 may be an example of aspects of the transceiver 840 described with reference to FIG. 8.

Receiver 510 may receive one or more system information messages. In some cases, a power gap parameter is identified based on the system information message. In some cases, the system information message is transmitted using an LTE band, a mmW band, a sub 5 GHz band, or any combination thereof. In some cases, the system information message includes a SIB message, a UE specific PDSCH message, a dedicated subframe broadcast, or any combination thereof. In some cases, the dedicated subframe broadcast includes an extended physical broadcast channel.

UE random access manager 515 may be an example of aspects of the UE random access manager 815 described with reference to FIG. 8. UE random access manager 515 may identify a set of beam directions that satisfy a transmit power condition, select a beam direction from the set of beam directions, and transmit a random access signal using resources corresponding to the selected beam direction.

UE random access manager 515 may also transmit a first random access signal at a first transmit power during a first time period associated with a first beam direction, determine that a random access response to the first random access signal has not been received, select a second transmit power and a second beam direction based on the determination, and transmit a second random access signal using the second transmit power during a second time period associated with the second beam direction.

Transmitter 520 may transmit signals generated by other components of the device. In some examples, the transmitter 520 may be collocated with a receiver 510 in a transceiver module. For example, the transmitter 520 may be an example of aspects of the transceiver 840 described with reference to FIG. 8. The transmitter 520 may include a single antenna, or it may include a set of antennas.

Figure 6:
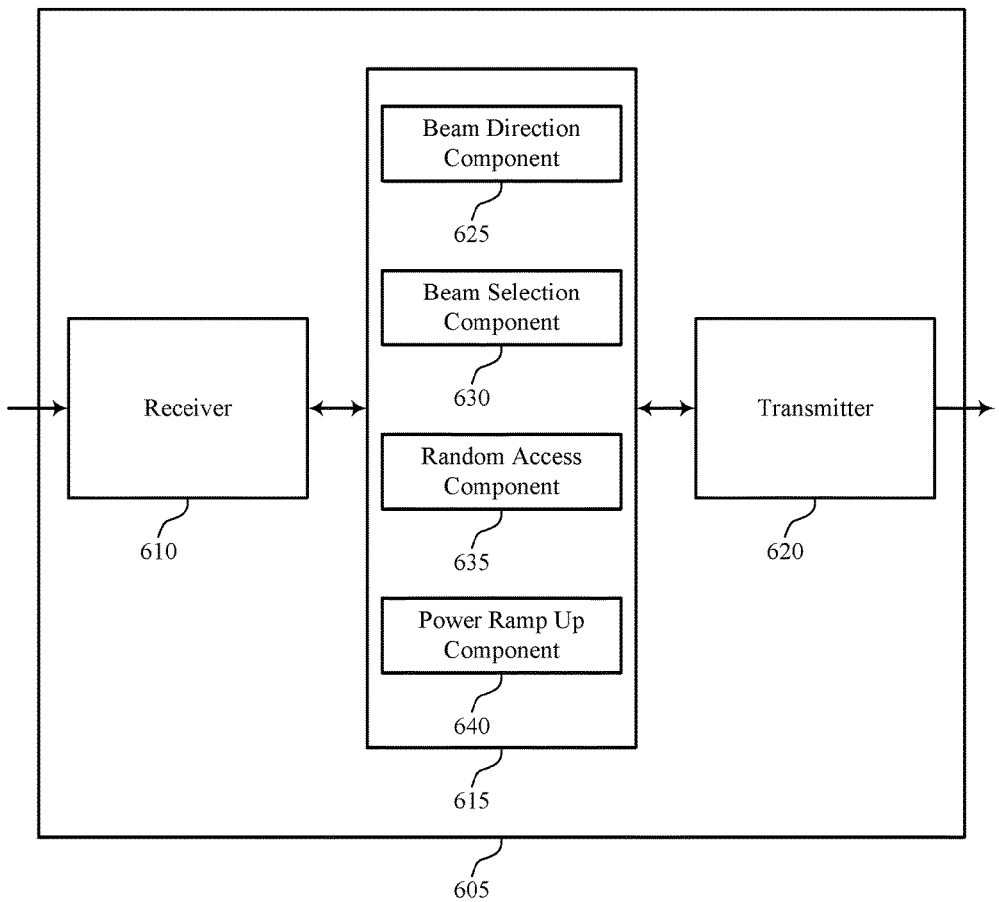

FIG. 6 shows a block diagram 600 of a device 605 that supports beam and symbol selection to transmit RACH in accordance with various aspects of the present disclosure. Device 605 may be an example of aspects of a device 505 or a UE 115 as described with reference to FIGS. 1, 2 and 5. Device 605 may include receiver 610, UE random access manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to beam and symbol selection to transmit RACH, etc.). Information may be passed on to other components of the device. The receiver 610 may be an example of aspects of the transceiver 840 described with reference to FIG. 8.

UE random access manager 615 may be an example of aspects of the UE random access manager 815 described with reference to FIG. 8. UE random access manager 615 may also include beam direction component 625, beam selection component 630, random access component 635, and power ramp up component 640.

Beam direction component 625 may identify a set of beam directions that satisfy a transmit power condition. Beam selection component 630 may select a beam direction from the set of beam directions and identify a preferred beam direction based on the determination that the random access response to the first random access signal has not been received, where the preferred beam direction is not equal to the first beam direction. In some cases, the beam direction is selected randomly from among the set of beam directions.

Random access component 635 may transmit a random access signal using resources corresponding to the selected beam direction, transmit a first random access signal at a first transmit power during a first time period associated with a first beam direction, determine that a random access response to the first random access signal has not been received, and transmit a second random access signal using the second transmit power during a second time period associated with the second beam direction.

Power ramp up component 640 may increase a transmit power if a random access message is not successful. Power ramp up component 640 may select a second transmit power for a second beam direction based on the determination, and receive a power ramp up configuration from a base station, where the second transmit power and the second beam direction are based on the power ramp up indication. In some cases, the second transmit power is greater than the first transmit power and the second beam direction is equal to the first beam direction. In some cases, the second transmit power is equal to the first transmit power and the second beam direction is equal to the preferred beam direction. In some cases, the second transmit power is greater than the first transmit power and the second beam direction is equal to the preferred beam direction. In some cases, the power ramp up configuration is transmitted in a SIB message.

Transmitter 620 may transmit signals generated by other components of the device. In some examples, the transmitter 620 may be collocated with a receiver 610 in a transceiver module. For example, the transmitter 620 may be an example of aspects of the transceiver 840 described with reference to FIG. 8. The transmitter 620 may include a single antenna, or it may include a set of antennas.

Figure 7:
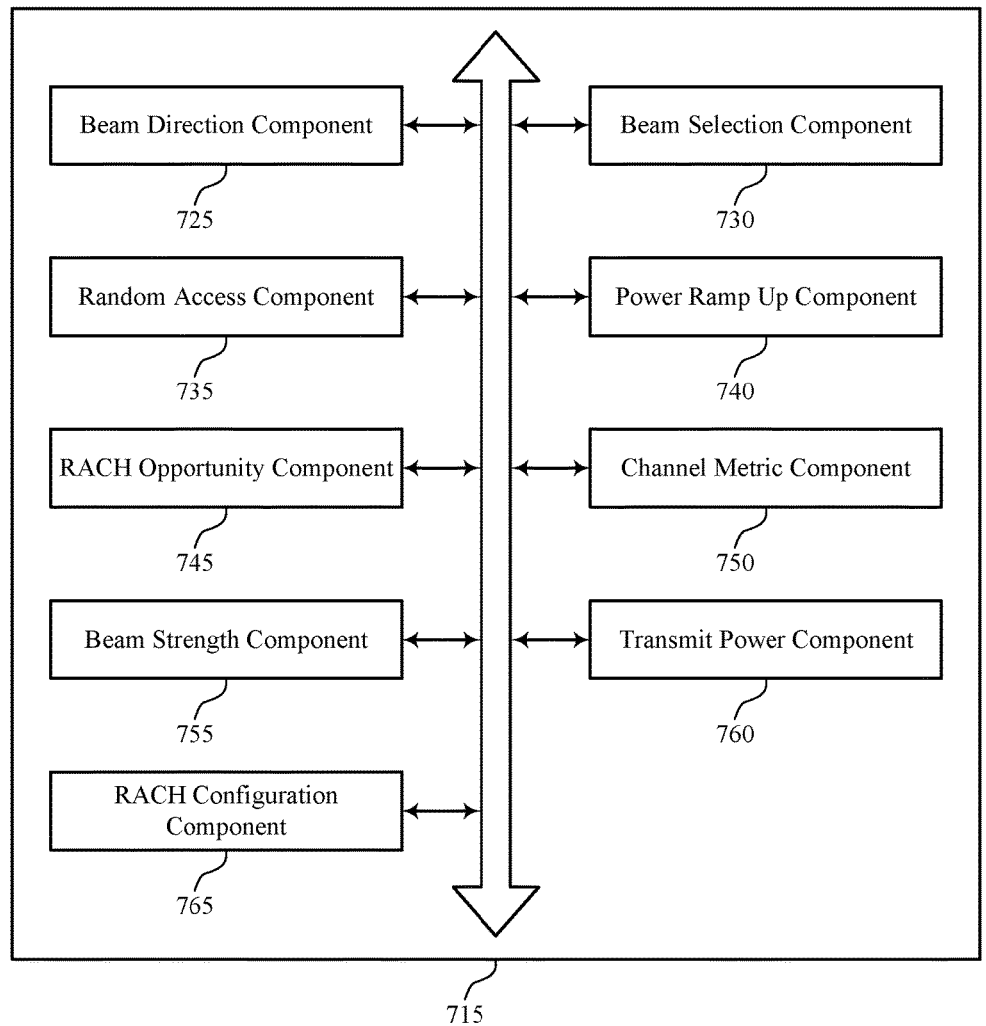

FIG. 7 shows a block diagram 700 of a UE random access manager 715 that supports beam and symbol selection to transmit RACH in accordance with various aspects of the present disclosure. The UE random access manager 715 may be an example of aspects of a UE random access manager 515, a UE random access manager 615, or a UE random access manager 815 described with reference to FIGS. 5, 6, and 8. The UE random access manager 715 may include beam direction component 725, beam selection component 730, random access component 735, and power ramp up component 740. Each of these modules may communicate, directly or indirectly, with one another (e.g., via one or more buses).

Beam direction component 725 may identify a set of beam directions that satisfy a transmit power condition. Beam direction component 725 may also receive a set of directional synchronization signals, where each of the set of beam directions corresponds to one of the set of directional synchronization signals. Beam selection component 730 may select a beam direction from the set of beam directions and identify a preferred beam direction based on the determination that the random access response to the first random access signal has not been received, where the preferred beam direction is not equal to the first beam direction.

Random access component 735 may transmit a random access signal using resources corresponding to the selected beam direction, transmit a first random access signal at a first transmit power during a first time period associated with a first beam direction, determine that a random access response to the first random access signal has not been received, and transmit a second random access signal using the second transmit power during a second time period associated with the second beam direction.

Power ramp up component 740 may select a second transmit power and a second beam direction based on the determination and receive a power ramp up configuration from a base station, where the second transmit power and the second beam direction are based on the power ramp up indication.

RACH opportunity component 745 may identify a next random access time period, where the beam direction is selected based on the next random access period including a random access opportunity corresponding to the beam direction and identify a next random access time period, where the preferred beam direction is selected based on the next random access period including a random access opportunity corresponding to the preferred beam direction.

Channel metric component 750 may determine a channel metric for each of the set of beam directions, where the beam direction is selected based on the channel metric for each of the set of beam directions.

Beam strength component 755 may determine a beam strength for each of the set of beam directions, where the beam direction is selected based on the beam strength for each of the set of beam directions.

Transmit power component 760 may identify a target receive power and a maximum transmit power, identify a path loss for each of the set of beam directions, where the transmit power condition is based on the target receive power, the maximum transmit power, and the path loss for each of the set of beam directions, and determine a transmit power based on the target receive power, the maximum transmit power, and a path loss for the beam direction, where the random access signal is transmitted using the identified transmit power.

Transmit power component 760 may also identify a power gap parameter, determine that a sum of the target receive power and a path loss for the beam direction is less than a sum of the maximum transmit power and the power gap parameter, where transmitting the random access signal is based on the determination, identify a power gap parameter, determine that a sum of the target receive power and a path loss for a previously identified beam direction is greater than a sum of the maximum transmit power and the power gap parameter, and refrain from transmitting the random access signal at a time associated with the previously identified beam direction based on the determination.

In some cases, determining that a sum of the target receive power and the path loss for the beam direction is greater than the maximum transmit power, where determining the transmit power includes setting the transmit power to the maximum transmit power. In some cases, determining that a sum of the target receive power and the path loss for the beam direction is less than the maximum transmit power, where determining the transmit power includes setting the transmit power to the sum of the target receive power and the path loss for the beam direction.

RACH configuration component 765 may receive a random access configuration from a base station, where the transmit power condition is based on the configuration message.

Figure 8:
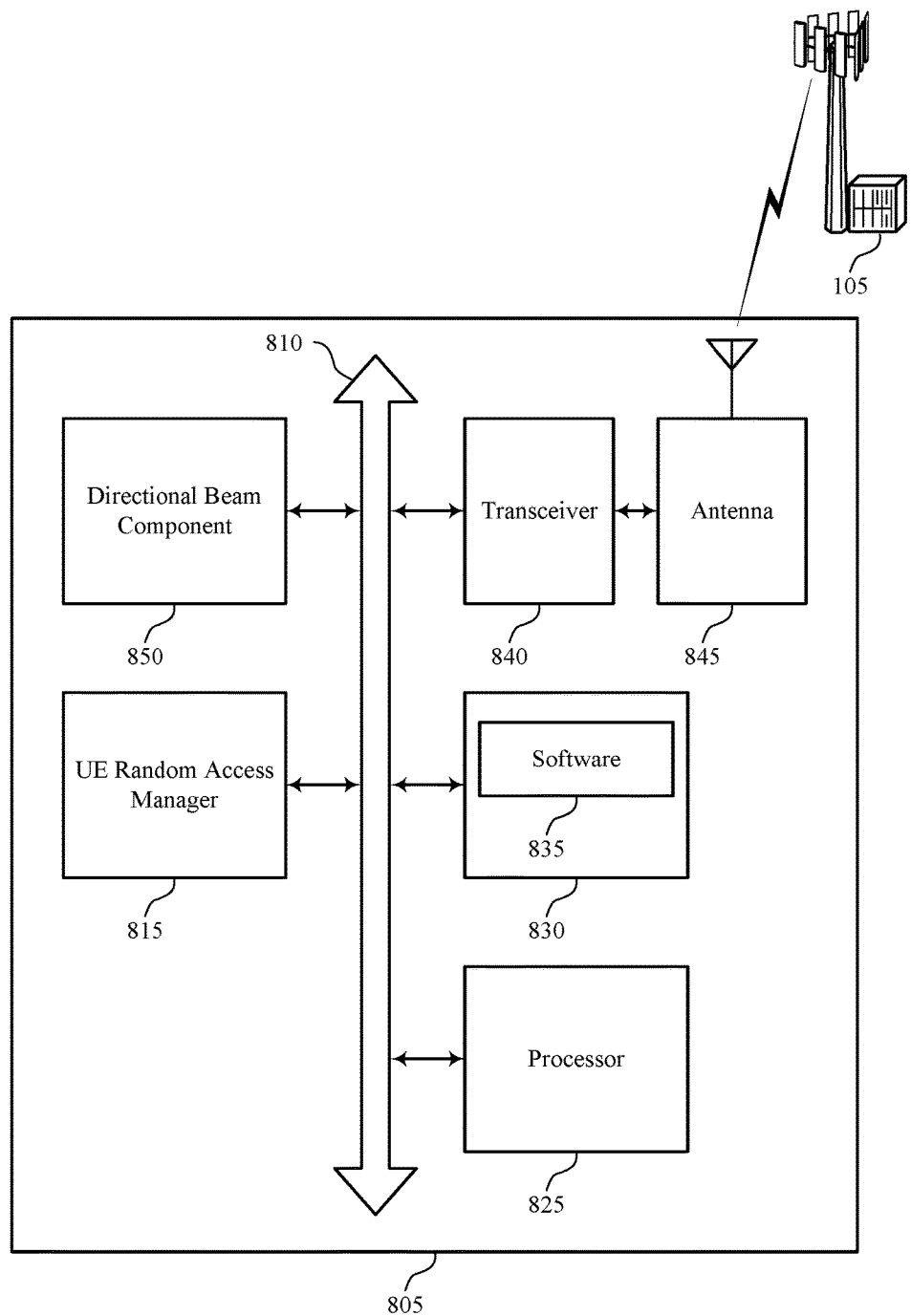
FIG. 8 illustrates a block diagram of a system including a user equipment (UE) that supports beam and symbol selection to transmit RACH in accordance with aspects of the present disclosure.

FIG. 8 shows a diagram of a system 800 including a device 805 that supports beam and symbol selection to transmit RACH in accordance with various aspects of the present disclosure. Device 805 may be an example of a device 505, device 605, or a UE 115 as described above, e.g., with reference to FIGS. 1, 2, 5 and 6.

Device 805 may include components for bi-directional voice and data communications including components for transmitting and receiving communications, including UE random access manager 815, processor 825, memory 830, software 835, transceiver 840, antenna 845, and directional beam component 850.

Processor 825 may include an intelligent hardware device, (e.g., a central processing unit (CPU), a microcontroller, an application specific integrated circuit (ASIC), etc.) Memory 830 may include random access memory (RAM) and read only memory (ROM). The memory 830 may store computer-readable, computer-executable software 835 including instructions that, when executed, cause the processor to perform various functions described herein. In some cases, the memory 830 can contain, among other things, a Basic Input-Output system (BIOS) which may control basic hardware and/or software operation such as the interaction with peripheral components or devices.

Software 835 may include code to implement aspects of the present disclosure, including code to support beam and symbol selection to transmit RACH. Software 835 can be stored in a non-transitory computer-readable medium such as system memory or other memory. In some cases, the software 835 may not be directly executable by the processor but may cause a computer (e.g., when compiled and executed) to perform functions described herein.

Transceiver 840 may communicate bi-directionally, via one or more antennas, wired, or wireless links as described above. For example, the transceiver 840 may represent a wireless transceiver and may communicate bi-directionally with another wireless transceiver. The transceiver 840 may also include a modem to modulate the packets and provide the modulated packets to the antennas for transmission, and to demodulate packets received from the antennas. In some cases, the wireless device may include a single antenna 845. However, in some cases the device may have more than one antenna 845, which may be capable of concurrently transmitting or receiving multiple wireless transmissions. Directional beam component 850 may enable beamforming operations as described above.

Figure 9:
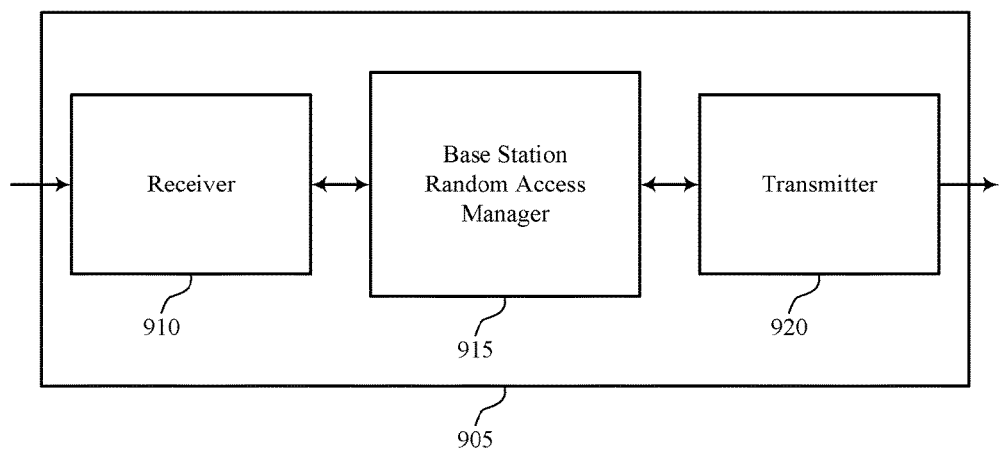
FIGS. 9 through 11 show block diagrams of a device that supports beam and symbol selection to transmit RACH in accordance with aspects of the present disclosure.

FIG. 9 shows a block diagram 900 of a device 905 that supports beam and symbol selection to transmit RACH in accordance with various aspects of the present disclosure. Device 905 may be an example of aspects of a base station 105 as described with reference to FIGS. 1 and 2. Device 905 may include receiver 910, base station random access manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to beam and symbol selection to transmit RACH, etc.). Information may be passed on to other components of the device. The receiver 910 may be an example of aspects of the transceiver 1240 described with reference to FIG. 12.

Base station random access manager 915 may be an example of aspects of the base station random access manager 1215 described with reference to FIG. 12. Base station random access manager 915 may transmit a random access configuration to a UE, where the random access configuration indicates a procedure for selecting a beam direction based on a transmit power condition, and receive a random access signal from the UE based on the procedure.

Base station random access manager 915 may also transmit a power ramp up configuration to a UE, where the power ramp up configuration indicates a procedure for selecting a transmit power and a beam direction following a failure of a random access signal, and receive a random access signal from the UE based on the procedure.

Transmitter 920 may transmit signals generated by other components of the device. In some examples, the transmitter 920 may be collocated with a receiver 910 in a transceiver module. For example, the transmitter 920 may be an example of aspects of the transceiver 1240 described with reference to FIG. 12. The transmitter 920 may include a set of antennas or one or more antenna arrays.

Figure 10:
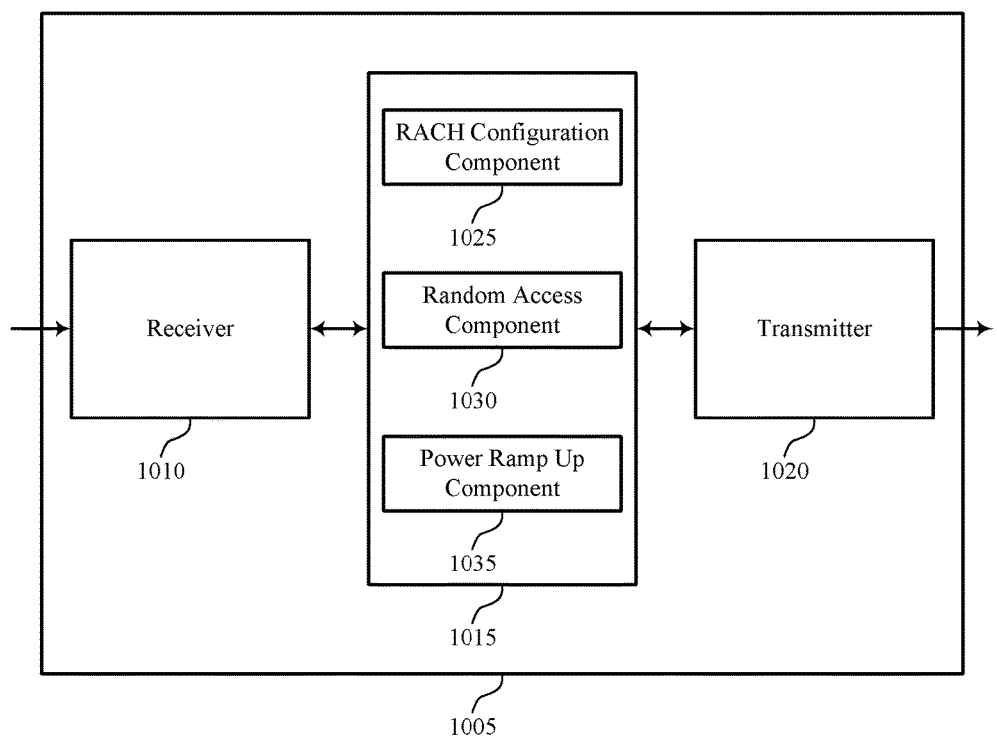

FIG. 10 shows a block diagram 1000 of a device 1005 that supports beam and symbol selection to transmit RACH in accordance with various aspects of the present disclosure. Device 1005 may be an example of aspects of a device 905 or a base station 105 as described with reference to FIGS. 1, 2 and 9. Device 1005 may include receiver 1010, base station random access manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to beam and symbol selection to transmit RACH, etc.). Information may be passed on to other components of the device. The receiver 1010 may be an example of aspects of the transceiver 1240 described with reference to FIG. 12.

Base station random access manager 1015 may be an example of aspects of the base station random access manager 1215 described with reference to FIG. 12. Base station random access manager 1015 may also include RACH configuration component 1025, random access component 1030, and power ramp up component 1035.

RACH configuration component 1025 may transmit a random access configuration to a UE, where the random access configuration indicates a procedure for selecting a beam direction based on a transmit power condition. In some cases, the procedure for selecting the beam direction is based on a next random access time period including a random access opportunity for the beam direction, a channel metric, a beam strength, a random selection procedure, or any combination thereof.

Random access component 1030 may receive a random access signal from the UE based on the procedure and receive a random access signal from the UE based on the procedure. Power ramp up component 1035 may transmit a power ramp up configuration to a UE, where the power ramp up configuration indicates a procedure for selecting a transmit power and a beam direction following a failure of a random access signal.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1240 described with reference to FIG. 12. The transmitter 1020 may include a set of antennas or one or more antenna arrays.

Figure 11:
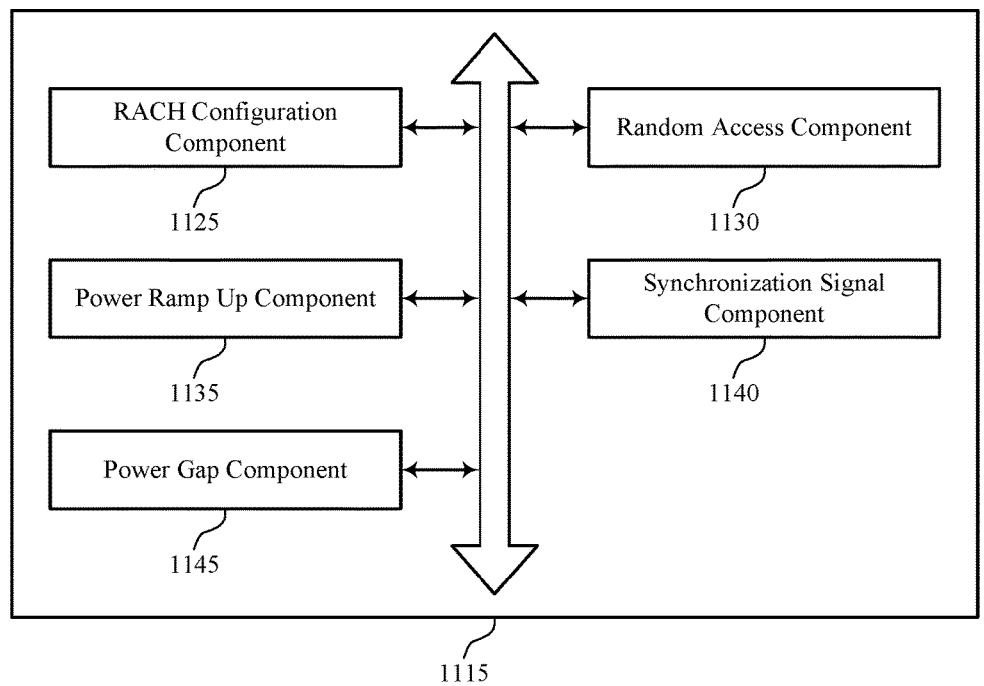

FIG. 11 shows a block diagram 1100 of a base station random access manager 1115 that supports beam and symbol selection to transmit RACH in accordance with various aspects of the present disclosure. The base station random access manager 1115 may be an example of aspects of a base station random access manager 915, a base station random access manager 1015, or a base station random access manager 1215 described with reference to FIGS. 9, 10, and 12. The base station random access manager 1115 may include RACH configuration component 1125, random access component 1130, and power ramp up component 1135. Each of these modules may communicate, directly or indirectly, with one another (e.g., via one or more buses).

RACH configuration component 1125 may transmit a random access configuration to a UE, where the random access configuration indicates a procedure for selecting a beam direction based on a transmit power condition. In some cases, the procedure for selecting the beam direction is based on a next random access time period including a random access opportunity for the beam direction, a channel metric, a beam strength, a random selection procedure, or any combination thereof Random access component 1130 may receive a random access signal from the UE based on the procedure and receive a random access signal from the UE based on the procedure. Power ramp up component 1135 may transmit a power ramp up configuration to a UE, where the power ramp up configuration indicates a procedure for selecting a transmit power and a beam direction following a failure of a random access signal.

Synchronization signal component 1140 may transmit a set of directional synchronization signals, where the random access signal is received during a time period associated with a beam direction of one of the set of directional synchronization signals.

Power gap component 1145 may determine a power gap parameter for a UE to determine when to transmit a RACH message. In some cases, the random access configuration includes a power gap parameter that indicates a threshold for transmitting a random access message when a sum of a target receive power and a path loss is greater a maximum transmit power.

Figure 12:
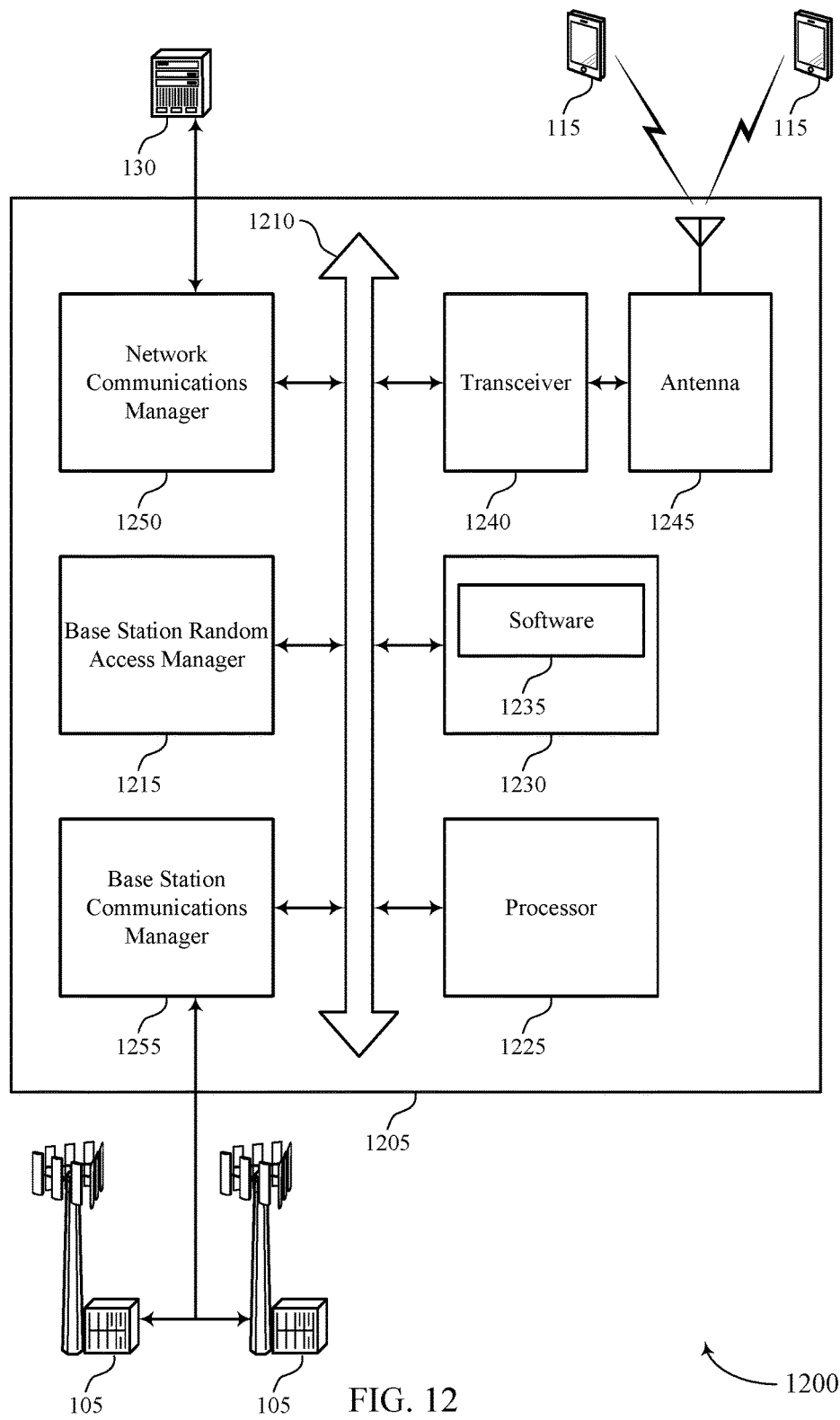
FIG. 12 illustrates a block diagram of a system including a base station that supports beam and symbol selection to transmit RACH in accordance with aspects of the present disclosure.

FIG. 12 shows a diagram of a system 1200 including a device 1205 that supports beam and symbol selection to transmit RACH in accordance with various aspects of the present disclosure. Device 1205 may be an example of a device 905, device 1005, or a base station 105 as described above, e.g., with reference to FIGS. 1, 2, 9 and 10.

Device 1205 may include components for bi-directional voice and data communications including components for transmitting and receiving communications, including base station random access manager 1215, processor 1225, memory 1230, software 1235, transceiver 1240, antenna 1245, network communications manager 1250, and base station communications manager 1255.

Processor 1225 may include an intelligent hardware device, (e.g., a CPU, a microcontroller, an ASIC, etc.) Memory 1230 may include RAM and ROM. The memory 1230 may store computer-readable, computer-executable software 1235 including instructions that, when executed, cause the processor to perform various functions described herein. In some cases, the memory 1230 can contain, among other things, a BIOS which may control basic hardware and/or software operation such as the interaction with peripheral components or devices.

Software 1235 may include code to implement aspects of the present disclosure, including code to support beam and symbol selection to transmit RACH. Software 1235 can be stored in a non-transitory computer-readable medium such as system memory or other memory. In some cases, the software 1235 may not be directly executable by the processor but may cause a computer (e.g., when compiled and executed) to perform functions described herein.

Transceiver 1240 may communicate bi-directionally, via one or more antennas or antenna arrays, wired, or wireless links as described above. For example, the transceiver 1240 may represent a wireless transceiver and may communicate bi-directionally with another wireless transceiver. The transceiver 1240 may also include a modem to modulate the packets and provide the modulated packets to the antennas for transmission, and to demodulate packets received from the antennas. In some cases, the device may have more than one antenna 1245, which may be capable of concurrently transmitting or receiving multiple wireless transmissions.

Network communications manager 1250 may manage communications with the core network (e.g., via one or more wired backhaul links). For example, the network communications manager 1250 may manage the transfer of data communications for client devices, such as one or more UEs 115.

Base station communications manager 1255 may manage communications with other base station 105, and may include a controller or scheduler for controlling communications with UEs 115 in cooperation with other base stations 105. For example, the base station communications manager 1255 may coordinate scheduling for transmissions to UEs 115 for various interference mitigation techniques such as beamforming or joint transmission. In some examples, base station communications manager 1255 may provide an X2 interface within an LTE/LTE-A wireless communication network technology to provide communication between base stations 105.

Figure 13:
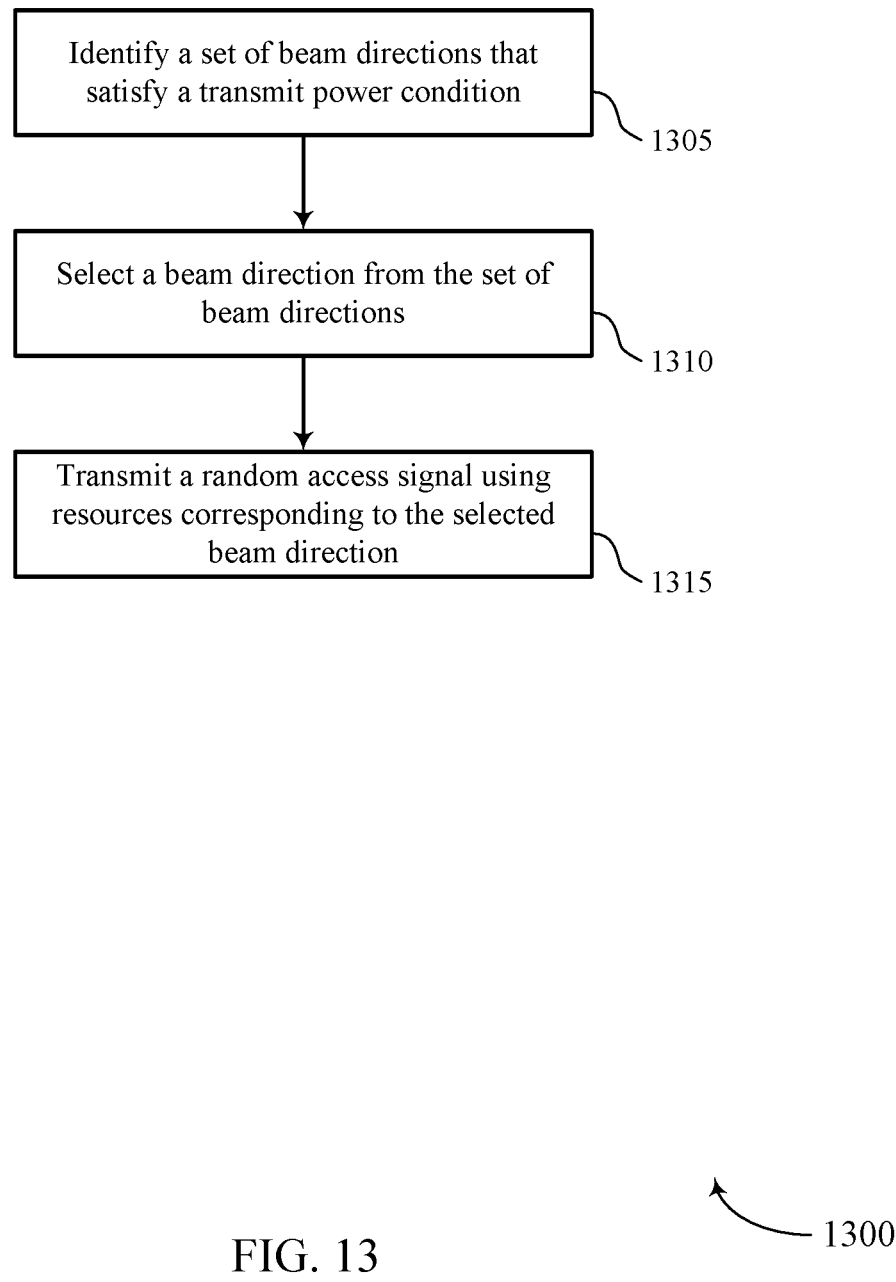
FIGS. 13 through 21 illustrate methods for beam and symbol selection to transmit RACH in accordance with aspects of the present disclosure.

FIG. 13 shows a flowchart illustrating a method 1300 for beam and symbol selection to transmit RACH in accordance with various aspects of the present disclosure. The operations of method 1300 may be implemented by a UE 115 or its components as described herein. For example, the operations of method 1300 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1305, the UE 115 may identify a set of beam directions that satisfy a transmit power condition. The operations of block 1305 may be performed according to the methods described with reference to FIGS. 2 through 4. In certain examples, aspects of the operations of block 1305 may be performed by a beam direction component as described with reference to FIGS. 5 through 7.

At block 1310, the UE 115 may select a beam direction from the set of beam directions. The operations of block 1310 may be performed according to the methods described with reference to FIGS. 2 through 4. In certain examples, aspects of the operations of block 1310 may be performed by a beam selection component as described with reference to FIGS. 5 through 7.

At block 1315, the UE 115 may transmit a random access signal using resources corresponding to the selected beam direction. The operations of block 1315 may be performed according to the methods described with reference to FIGS. 2 through 4. In certain examples, aspects of the operations of block 1315 may be performed by a random access component as described with reference to FIGS. 5 through 7.

Figure 14:
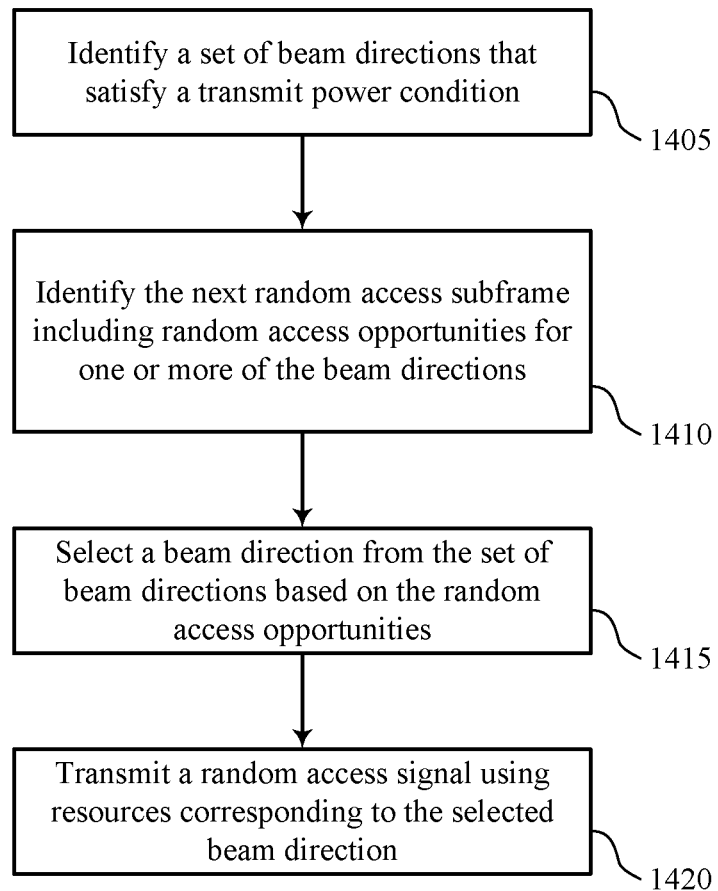

FIG. 14 shows a flowchart illustrating a method 1400 for beam and symbol selection to transmit RACH in accordance with various aspects of the present disclosure. The operations of method 1400 may be implemented by a UE 115 or its components as described herein. For example, the operations of method 1400 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may identify a set of beam directions that satisfy a transmit power condition. The operations of block 1405 may be performed according to the methods described with reference to FIGS. 2 through 4. In certain examples, aspects of the operations of block 1405 may be performed by a beam direction component as described with reference to FIGS. 5 through 7.

At block 1410, the UE 115 may identify a next random access time period, where the beam direction is selected based on the next random access period including a random access opportunity corresponding to the beam direction. For example, the UE 115 may identify the next random access subframe including random access opportunities for one or more of the beam directions. In some cases, the beam direction may be selected based on whether the random access opportunity corresponding to the selected beam direction is available in the next random access subframe. The operations of block 1410 may be performed according to the methods described with reference to FIGS. 2 through 4. In certain examples, aspects of the operations of block 1410 may be performed by a RACH opportunity component as described with reference to FIGS. 5 through 7.

At block 1415, the UE 115 may select a beam direction from the set of beam directions. In some cases, the beam direction is selected based on a random access opportunity as described above. The operations of block 1415 may be performed according to the methods described with reference to FIGS. 2 through 4. In certain examples, aspects of the operations of block 1415 may be performed by a beam selection component as described with reference to FIGS. 5 through 7.

At block 1420, the UE 115 may transmit a random access signal using resources corresponding to the selected beam direction. The operations of block 1420 may be performed according to the methods described with reference to FIGS. 2 through 4. In certain examples, aspects of the operations of block 1420 may be performed by a random access component as described with reference to FIGS. 5 through 7.

Figure 15:
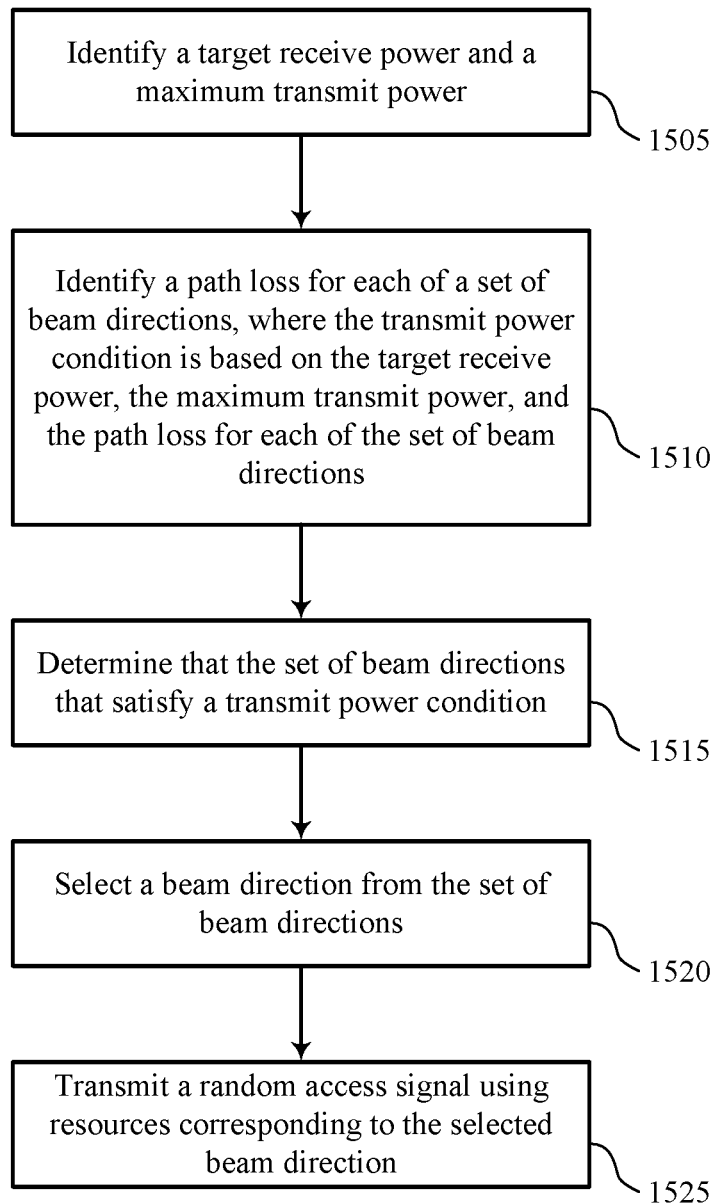

FIG. 15 shows a flowchart illustrating a method 1500 for beam and symbol selection to transmit RACH in accordance with various aspects of the present disclosure. The operations of method 1500 may be implemented by a UE 115 or its components as described herein. For example, the operations of method 1500 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may identify a target receive power and a maximum transmit power. The operations of block 1505 may be performed according to the methods described with reference to FIGS. 2 through 4. In certain examples, aspects of the operations of block 1505 may be performed by a transmit power component as described with reference to FIGS. 5 through 7.

At block 1510, the UE 115 may identify a path loss for each of a set of beam directions, where a transmit power condition is based on the target receive power, the maximum transmit power, and the path loss for each of the set of beam directions. The operations of block 1510 may be performed according to the methods described with reference to FIGS. 2 through 4. In certain examples, aspects of the operations of block 1510 may be performed by a transmit power component as described with reference to FIGS. 5 through 7.

At block 1515, the UE 115 may identify a set of beam directions that satisfy the transmit power condition. The operations of block 1515 may be performed according to the methods described with reference to FIGS. 2 through 4. In certain examples, aspects of the operations of block 1515 may be performed by a beam direction component as described with reference to FIGS. 5 through 7.

At block 1520, the UE 115 may select a beam direction from the set of beam directions. The operations of block 1520 may be performed according to the methods described with reference to FIGS. 2 through 4. In certain examples, aspects of the operations of block 1520 may be performed by a beam selection component as described with reference to FIGS. 5 through 7.

At block 1525, the UE 115 may transmit a random access signal using resources corresponding to the selected beam direction. The operations of block 1525 may be performed according to the methods described with reference to FIGS. 2 through 4. In certain examples, aspects of the operations of block 1525 may be performed by a random access component as described with reference to FIGS. 5 through 7.

Figure 16:
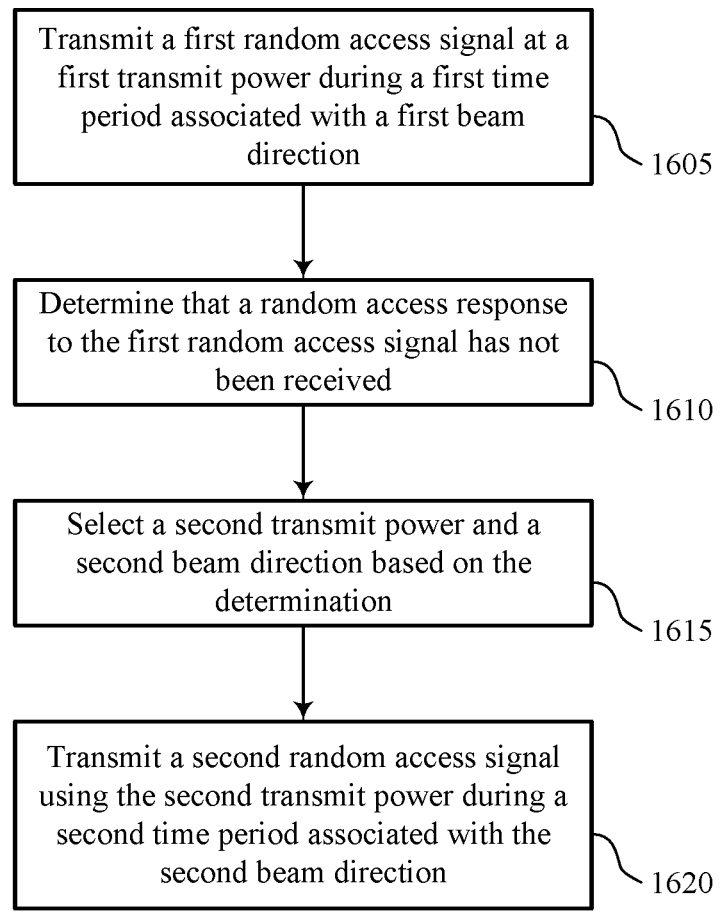

FIG. 16 shows a flowchart illustrating a method 1600 for beam and symbol selection to transmit RACH in accordance with various aspects of the present disclosure. The operations of method 1600 may be implemented by a UE 115 or its components as described herein. For example, the operations of method 1600 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may transmit a first random access signal at a first transmit power during a first time period associated with a first beam direction. The operations of block 1605 may be performed according to the methods described with reference to FIGS. 2 through 4. In certain examples, aspects of the operations of block 1605 may be performed by a random access component as described with reference to FIGS. 5 through 7.

At block 1610, the UE 115 may determine that a random access response to the first random access signal has not been received. The operations of block 1610 may be performed according to the methods described with reference to FIGS. 2 through 4. In certain examples, aspects of the operations of block 1610 may be performed by a random access component as described with reference to FIGS. 5 through 7.

At block 1615, the UE 115 may select a second transmit power and a second beam direction based on the determination. The operations of block 1615 may be performed according to the methods described with reference to FIGS. 2 through 4. In certain examples, aspects of the operations of block 1615 may be performed by a power ramp up component as described with reference to FIGS. 5 through 7.

At block 1620, the UE 115 may transmit a second random access signal using the second transmit power during a second time period associated with the second beam direction. The operations of block 1620 may be performed according to the methods described with reference to FIGS. 2 through 4. In certain examples, aspects of the operations of block 1620 may be performed by a random access component as described with reference to FIGS. 5 through 7.

Figure 17:
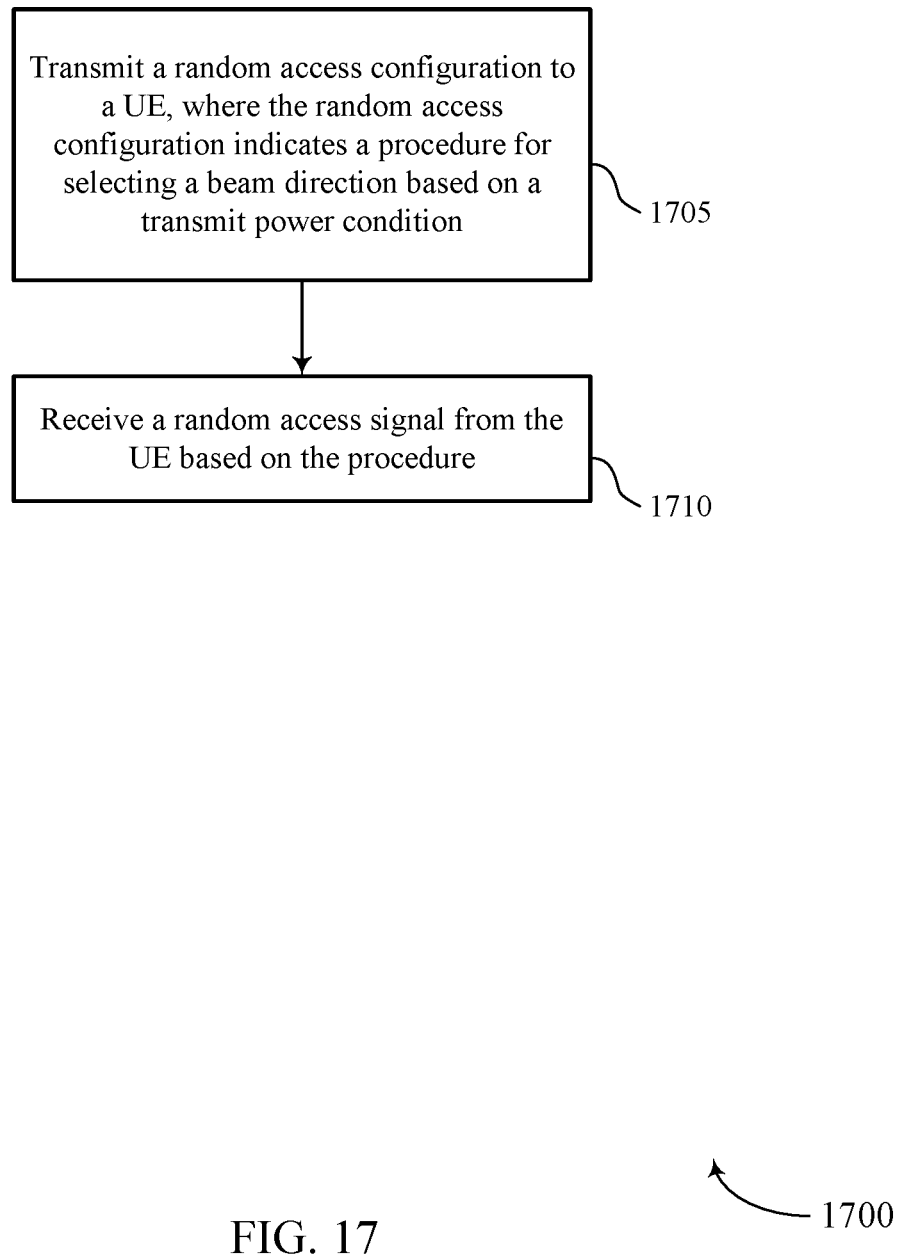

FIG. 17 shows a flowchart illustrating a method 1700 for beam and symbol selection to transmit RACH in accordance with various aspects of the present disclosure. The operations of method 1700 may be implemented by a base station 105 or its components as described herein. For example, the operations of method 1700 may be performed by a base station random access manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may transmit a random access configuration to a UE, where the random access configuration indicates a procedure for selecting a beam direction based on a transmit power condition. The operations of block 1705 may be performed according to the methods described with reference to FIGS. 2 through 4. In certain examples, aspects of the operations of block 1705 may be performed by a RACH configuration component as described with reference to FIGS. 9 through 11.

At block 1710, the base station 105 may receive a random access signal from the UE based on the procedure. The operations of block 1710 may be performed according to the methods described with reference to FIGS. 2 through 4. In certain examples, aspects of the operations of block 1710 may be performed by a random access component as described with reference to FIGS. 9 through 11.

Figure 18:
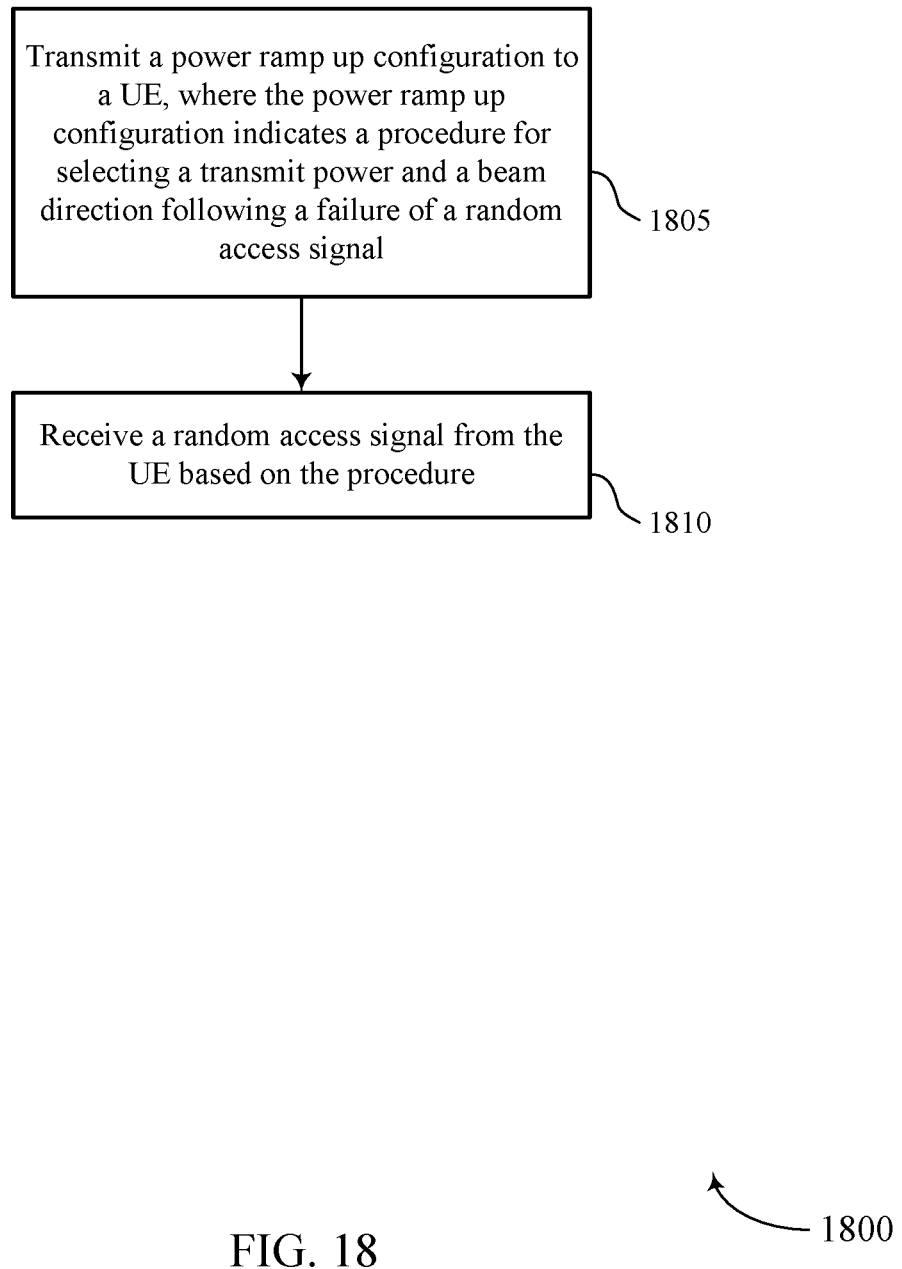

FIG. 18 shows a flowchart illustrating a method 1800 for beam and symbol selection to transmit RACH in accordance with various aspects of the present disclosure. The operations of method 1800 may be implemented by a base station 105 or its components as described herein. For example, the operations of method 1800 may be performed by a base station random access manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1805, the base station 105 may transmit a power ramp up configuration to a UE, where the power ramp up configuration indicates a procedure for selecting a transmit power and a beam direction following a failure of a random access signal. The operations of block 1805 may be performed according to the methods described with reference to FIGS. 2 through 4. In certain examples, aspects of the operations of block 1805 may be performed by a power ramp up component as described with reference to FIGS. 9 through 11.

At block 1810, the base station 105 may receive a random access signal from the UE based on the procedure. The operations of block 1810 may be performed according to the methods described with reference to FIGS. 2 through 4. In certain examples, aspects of the operations of block 1810 may be performed by a random access component as described with reference to FIGS. 9 through 11.

Figure 19:
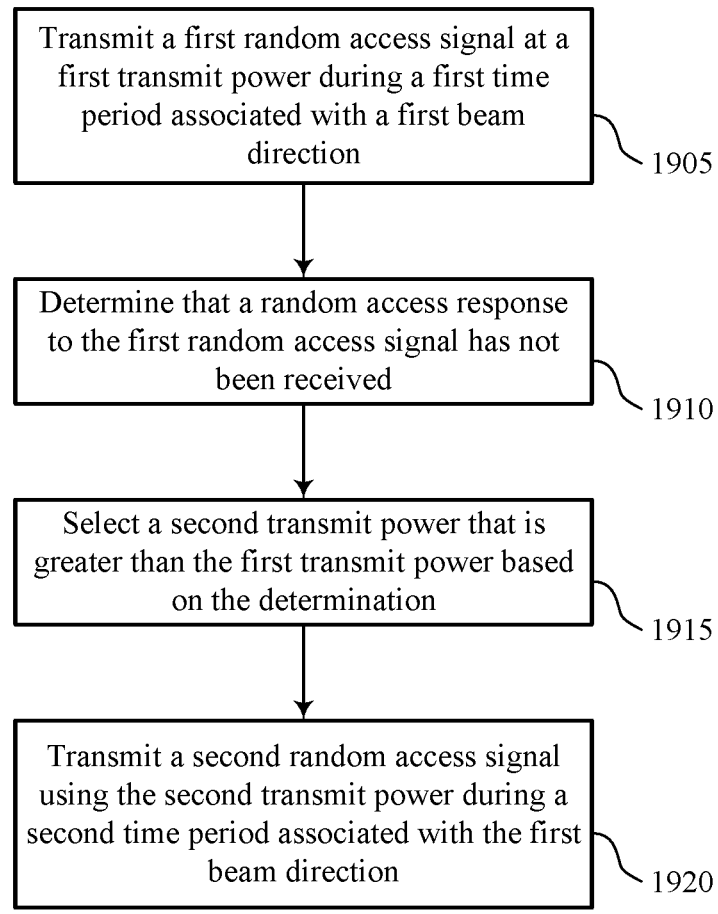

FIG. 19 shows a flowchart illustrating a method 1900 for beam and symbol selection to transmit RACH in accordance with various aspects of the present disclosure. The operations of method 1900 may be implemented by a UE 115 or its components as described herein. For example, the operations of method 1900 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1905, the UE 115 may transmit a first random access signal at a first transmit power during a first time period associated with a first beam direction. The operations of block 1905 may be performed according to the methods described with reference to FIGS. 2 through 4. In certain examples, aspects of the operations of block 1905 may be performed by a random access component as described with reference to FIGS. 5 through 7.

At block 1910, the UE 115 may determine that a random access response to the first random access signal has not been received. The operations of block 1910 may be performed according to the methods described with reference to FIGS. 2 through 4. In certain examples, aspects of the operations of block 1910 may be performed by a random access component as described with reference to FIGS. 5 through 7.

At block 1915, the UE 115 may select a second transmit power based on the determination. The second transmit power may be greater than the first transmit power. The operations of block 1915 may be performed according to the methods described with reference to FIGS. 2 through 4. In certain examples, aspects of the operations of block 1915 may be performed by a power ramp up component as described with reference to FIGS. 5 through 7.

At block 1920, the UE 115 may transmit a second random access signal using the second transmit power during a second time period associated with the first beam direction. The operations of block 1920 may be performed according to the methods described with reference to FIGS. 2 through 4. In certain examples, aspects of the operations of block 1920 may be performed by a random access component as described with reference to FIGS. 5 through 7.

Figure 20:
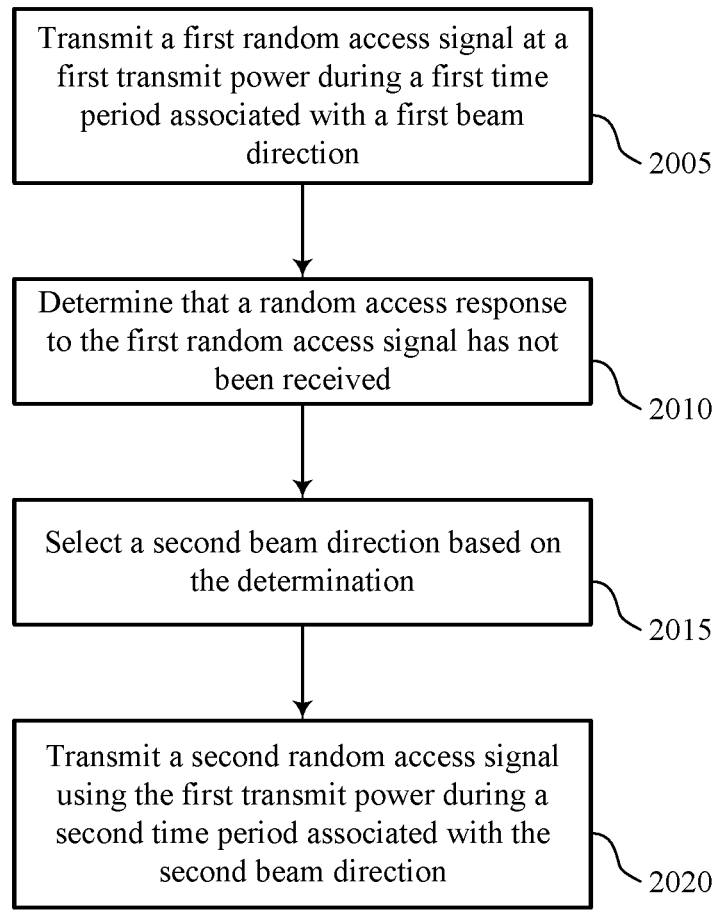

FIG. 20 shows a flowchart illustrating a method 2000 for beam and symbol selection to transmit RACH in accordance with various aspects of the present disclosure. The operations of method 2000 may be implemented by a UE 115 or its components as described herein. For example, the operations of method 2000 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 2005, the UE 115 may transmit a first random access signal at a first transmit power during a first time period associated with a first beam direction. The operations of block 2005 may be performed according to the methods described with reference to FIGS. 2 through 4. In certain examples, aspects of the operations of block 2005 may be performed by a random access component as described with reference to FIGS. 5 through 7.

At block 2010, the UE 115 may determine that a random access response to the first random access signal has not been received. The operations of block 2010 may be performed according to the methods described with reference to FIGS. 2 through 4. In certain examples, aspects of the operations of block 2010 may be performed by a random access component as described with reference to FIGS. 5 through 7.

At block 2015, the UE 115 may select a second beam direction based on the determination. The second beam direction may be different from the first beam direction and may be based on an updated beam selection procedure. For example, the UE 115 may receive one or more additional synchronization signals and beam reference signals and may select the second beam direction based on these additional synchronization signals and beam reference signals. The operations of block 2015 may be performed according to the methods described with reference to FIGS. 2 through 4. In certain examples, aspects of the operations of block 2015 may be performed by a power ramp up component as described with reference to FIGS. 5 through 7.

At block 2020, the UE 115 may transmit a second random access signal using the second transmit power during a second time period associated with the second beam direction. The operations of block 2020 may be performed according to the methods described with reference to FIGS. 2 through 4. In certain examples, aspects of the operations of block 2020 may be performed by a random access component as described with reference to FIGS. 5 through 7.

Figure 21:
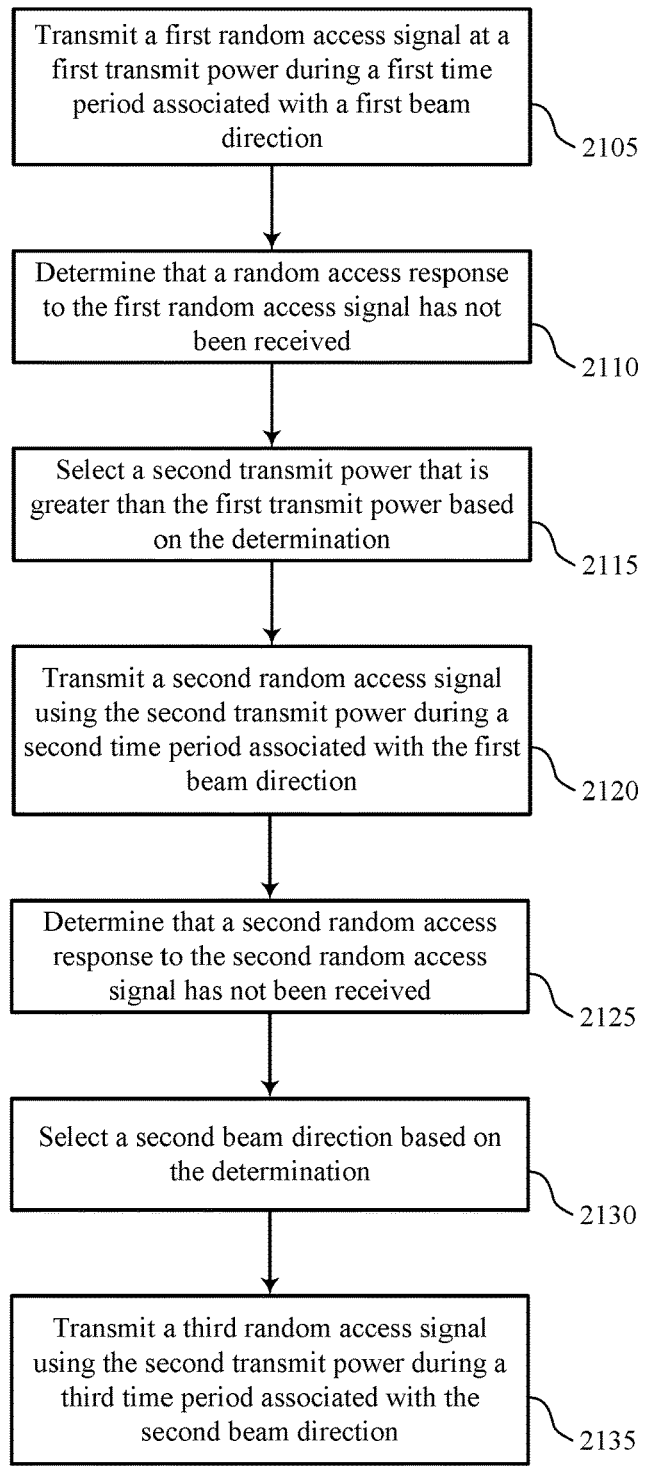

FIG. 21 shows a flowchart illustrating a method 2100 for beam and symbol selection to transmit RACH in accordance with various aspects of the present disclosure. The operations of method 2100 may be implemented by a UE 115 or its components as described herein. For example, the operations of method 2100 may be performed by a UE random access manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 2105, the UE 115 may transmit a first random access signal at a first transmit power during a first time period associated with a first beam direction. The operations of block 2105 may be performed according to the methods described with reference to FIGS. 2 through 4. In certain examples, aspects of the operations of block 2105 may be performed by a random access component as described with reference to FIGS. 5 through 7.

At block 2110, the UE 115 may determine that a random access response to the first random access signal has not been received. The operations of block 2110 may be performed according to the methods described with reference to FIGS. 2 through 4. In certain examples, aspects of the operations of block 2110 may be performed by a random access component as described with reference to FIGS. 5 through 7.

At block 2115, the UE 115 may select a second transmit power based on the determination. The second transmit power may be greater than the first transmit power. The operations of block 2115 may be performed according to the methods described with reference to FIGS. 2 through 4. In certain examples, aspects of the operations of block 2115 may be performed by a power ramp up component as described with reference to FIGS. 5 through 7.

At block 2120, the UE 115 may transmit a second random access signal using the second transmit power during a second time period associated with the first beam direction. The operations of block 2120 may be performed according to the methods described with reference to FIGS. 2 through 4. In certain examples, aspects of the operations of block 2120 may be performed by a random access component as described with reference to FIGS. 5 through 7.

At block 2125, the UE 115 may determine that a second random access response to the second random access signal has not been received. The operations of block 2125 may be performed according to the methods described with reference to FIGS. 2 through 4. In certain examples, aspects of the operations of block 2125 may be performed by a random access component as described with reference to FIGS. 5 through 7.

At block 2130, the UE 115 may select a second beam direction based on the determination. The second beam direction may be different from the first beam direction and may be based on an updated beam selection procedure. For example, the UE 115 may receive one or more additional synchronization signals and beam reference signals and may select the second beam direction based on these additional synchronization signals and beam reference signals. The operations of block 2130 may be performed according to the methods described with reference to FIGS. 2 through 4. In certain examples, aspects of the operations of block 2130 may be performed by a random access component as described with reference to FIGS. 5 through 7.

At block 2135, the UE 115 may transmit a third random access signal using the second transmit power using the second transmit power during a third time period associated with the second beam direction. The operations of block 2135 may be performed according to the methods described with reference to FIGS. 2 through 4. In certain examples, aspects of the operations of block 2135 may be performed by a random access component as described with reference to FIGS. 5 through 7. That is, in some cases, an updated transmit power and an updated beam direction may be alternately selection after each RACH failure. In some cases, the transmit power is updated first and then the beam direction. In other cases, the beam direction is updated and then the transmit power is increased.

Thus, some examples of the methods described above may include determining that a second random access response to the second random access signal has not been received and continuing to transmit additional random access signals until a corresponding additional random access response is received, wherein successive additional random access signals are alternately transmitted based on either an updated preferred beam direction or an increased transmit power It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, 1S-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a plurality of beam directions that satisfy a power threshold;
    selecting a beam direction from the identified plurality of beam directions; and
    transmitting a random access signal using resources of a next random access time period including a random access opportunity corresponding to the selected beam direction.

2. The method of claim 1, further comprising:
    identifying the next random access time period, wherein the beam direction is selected based at least in part on the next random access period including the random access opportunity corresponding to the beam direction.

3. The method of claim 1, further comprising:
    determining a channel metric for each of the identified plurality of beam directions, wherein the beam direction is selected based at least in part on the channel metric for each of the identified plurality of beam directions.

4. The method of claim 1, further comprising:
    determining a channel metric for each of the identified plurality of beam directions that has a corresponding random access opportunity in a next random access period, wherein the beam direction is selected based at least in part on a beam strength for each of the identified plurality of beam directions that has a corresponding random access opportunity in a next random access period.

5. The method of claim 1, wherein the beam direction is selected randomly from among the identified plurality of beam directions.

6. The method of claim 1, further comprising:
    identifying a target receive power and a maximum transmit power; and
    identifying a path loss for each of the identified plurality of beam directions, wherein the power threshold is based at least in part on the target receive power, the maximum transmit power, and the path loss for each of the identified plurality of beam directions.

7. The method of claim 6, further comprising:
    determining a transmit power based at least in part on the target receive power, the maximum transmit power, and a path loss for the selected beam direction, wherein the random access signal is transmitted using the identified transmit power.

8. The method of claim 7, wherein
    determining that a sum of the target receive power and the path loss for the selected beam direction is greater than the maximum transmit power, wherein determining the transmit power comprises: setting the transmit power to the maximum transmit power.

9. The method of claim 7, wherein
    determining that a sum of the target receive power and the path loss for the selected beam direction is less than the maximum transmit power, wherein determining the transmit power comprises: setting the transmit power to the sum of the target receive power and the path loss for the beam direction.

10. The method of claim 6, further comprising:
    identifying a power gap parameter; and
    determining that a sum of the target receive power and a path loss for the selected beam direction is less than a sum of the maximum transmit power and the power gap parameter, wherein transmitting the random access signal is based at least in part on the determination.

11. The method of claim 10, further comprising:
    receiving a system information message, wherein the power gap parameter is identified based at least in part on the system information message.

12. The method of claim 11, wherein the system information message is transmitted using a Long Term Evolution (LTE) band, a millimeter wave (mmW) band, a sub 5 GHz band, or any combination thereof.

13. The method of claim 11, wherein the system information message comprises a system information block (SIB) message, a user equipment (UE) specific physical downlink shared channel (PDSCH) message, a dedicated subframe broadcast, or any combination thereof.

14. The method of claim 13, wherein the dedicated subframe broadcast comprises an extended physical broadcast channel.

15. The method of claim 6, further comprising:
    identifying a power gap parameter;
    determining that a sum of the target receive power and a path loss for a previously identified beam direction is greater than a sum of the maximum transmit power and the power gap parameter; and refraining from transmitting the random access signal at a time associated with the previously identified beam direction based at least in part on the determination.

16. The method of claim 1, wherein identifying a plurality of beam directions and selecting a beam direction comprise identifying a plurality of beam identifications (IDs) and selecting a beam ID.

17. The method of claim 1, further comprising:
receiving a random access configuration message from a base station, wherein the power threshold is based at least in part on the configuration message.

18. The method of claim 1, further comprising:
receiving a plurality of directional synchronization signals, wherein each of the identified plurality of beam directions corresponds to one of the plurality of directional synchronization signals.

19. The method of claim 18, wherein the plurality of directional synchronization signals comprises a first set of directional synchronization signals transmitted during a first time period and interleaved with a second set of directional synchronization signals transmitted during a second time period.

20. The method of claim 18, wherein the plurality of directional synchronization signals comprises a first set of directional synchronization signals transmitted using a first set of antenna ports and interleaved with a second set of directional synchronization signals transmitted using a second set of antenna ports simultaneously with the first set of directional synchronization signals.

21. A method for wireless communication, comprising:
transmitting a random access configuration to a user equipment (UE), wherein the random access configuration indicates a procedure for identifying a plurality of beam directions that satisfy a power threshold and selecting a beam direction from the identified plurality of beam directions; and
receiving, from the UE, a random access signal in a next random access time period including a random access opportunity corresponding to the selected beam direction based at least in part on the procedure.

22. The method of claim 21, wherein the procedure for selecting the beam direction from the identified plurality of beam directions is based at least in part on the next random access time period comprising the random access opportunity for the beam direction, a channel metric, a beam strength, a random selection procedure, or any combination thereof.

23. The method of claim 21, further comprising:
transmitting a plurality of directional synchronization signals, wherein the random access signal is received during a time period associated with a beam direction of one of the plurality of directional synchronization signals.

24. The method of claim 21, wherein the random access configuration comprises a power gap parameter that indicates a threshold for transmitting a random access message when a sum of a target receive power and a path loss is greater a maximum transmit power.

25. The method of claim 21, further comprising:
transmitting a power ramp up configuration to the UE, wherein the power ramp up configuration indicates a procedure for selecting one or more of a transmit power and the beam direction from the identified plurality of beam directions following a failure of a random access signal, wherein the random access signal from the UE is received based at least in part on the procedure.

26. An apparatus for wireless communication, in a system comprising:
a processor;
memory in electronic communication with the processor; and
instructions stored in the memory and operable, when executed by the processor, to cause the apparatus to:
identify a plurality of beam directions that satisfy a power threshold;
select a beam direction from the identified plurality of beam directions; and
transmit a random access signal using resources of a next random access time period including a random access opportuntiy corresponding to the selected beam direction.

27. The apparatus of claim 26, wherein the instructions are further executable by the processor to:
identify the next random access time period, wherein the selected beam direction is selected based at least in part on the next random access period including the random access opportunity corresponding to the selected beam direction.

28. The apparatus of claim 26, wherein the instructions are further executable by the processor to:
determine a channel metric for each of the identified plurality of beam directions, wherein the selected beam direction is selected based at least in part on the channel metric for each of the identified plurality of beam directions.

29. An apparatus for wireless communication, in a system comprising:
a processor;
memory in electronic communication with the processor; and
instructions stored in the memory and operable, when executed by the processor, to cause the apparatus to:
transmit a random access configuration to a user equipment (UE), wherein the random access configuration indicates a procedure for identifying a plurality of beam directions that satisfy a power threshold and selecting a beam direction from the identified plurality of beam directions; and
receive, from the UE, a random access signal in a next random access time period including a random access opportunity corresponding to the selected beam direction based at least in part on the procedure.

30. The apparatus of claim 29, wherein the instructions are further executable by the processor to:
transmit a plurality of directional synchronization signals, wherein the random access signal is received during a time period associated with a beam direction of one of the plurality of directional synchronization signals.

* * * * *